United States Patent [19]

Wang

[11] Patent Number: 5,243,655
[45] Date of Patent: Sep. 7, 1993

[54] SYSTEM FOR ENCODING AND DECODING DATA IN MACHINE READABLE GRAPHIC FORM

[75] Inventor: Ynjiun P. Wang, Stony Brook, N.Y.

[73] Assignee: Symbol Technologies Inc., Bohemia, N.Y.

[21] Appl. No.: 851,505

[22] Filed: Mar. 16, 1992

Related U.S. Application Data

[63] Continuation-in-part of Ser. No. 461,881, Jan. 5, 1990, and Ser. No. 653,822, Feb. 11, 1991, Pat. No. 5,113,445, which is a continuation of Ser. No. 550,023, Jul. 9, 1990, abandoned.

[51] Int. Cl.⁵ ................................................ H04L 9/00
[52] U.S. Cl. ........................................ 380/51; 380/55; 380/3; 380/59; 235/462
[58] Field of Search ................... 380/51, 55, 3, 59; 235/462

[56] References Cited

U.S. PATENT DOCUMENTS

| | | | |
|---|---|---|---|
| 3,647,275 | 3/1972 | Ward | 350/3.5 |
| 3,676,644 | 7/1972 | Vaccaro et al. | 235/61 |
| 3,761,683 | 9/1973 | Rogers | 235/61 |
| 3,812,328 | 5/1974 | Tramposch | 235/61 |
| 4,654,718 | 3/1987 | Sueyoshi | 358/257 |
| 4,654,793 | 3/1987 | Elrod | 364/401 |
| 4,660,221 | 4/1987 | Dlugos | 380/23 |
| 4,794,239 | 12/1988 | Allais | 235/462 |
| 4,835,713 | 5/1989 | Pastor | 364/519 |
| 4,863,196 | 9/1989 | Ohnishi et al. | 283/82 |
| 4,893,333 | 1/1990 | Baran et al. | 379/100 |
| 4,908,873 | 3/1990 | Philibert et al. | 382/34 |
| 4,949,381 | 8/1990 | Pastor | 380/51 |
| 4,973,829 | 11/1990 | Ishida | 235/462 |
| 4,975,948 | 12/1990 | Andresen et al. | 379/355 |

FOREIGN PATENT DOCUMENTS 59-44157 3/1984 Japan .
62-91075 5/1987 Japan .

OTHER PUBLICATIONS

Wang et al., "Postal Applications of a High Density Bar Code" (Sep. 1990).
Wang, "PDF417 Specification" (1991).

*Primary Examiner*—David Cain

[57] ABSTRACT

A system for representing and recognizing data in machine readable graphic image form in which data to be encoded is entered into the system and a processor encodes the data into a two-dimensional bar code symbol and generates transfer drive signals representative of the symbol. A transferring device such as a printer transfers an image of the two-dimensional bar code symbol onto a carrier such as a card or paper document in response to the transfer drive signals. A recognition device converts the image on the carrier into electrical signals representative of the symbol by scanning the image. A low-level decoder decodes the signals by decoding each scan line into a vector of codeword values corresponding to the codewords in the two-dimensional bar code symbol, assigning a row number to each of the codeword values, and then filling in a two-dimensional matrix with the codeword values. A high-level decoder further decodes the codeword values into data which can then be output for processing or use.

32 Claims, 14 Drawing Sheets

Left Row Indicators — Data Codeword Area — Right Row Indicators

Error Correction Area

| PDF417 Security Level | |
|---|---|
| Security Level | Error Correction Codewords |
| 0 | 0 |
| 1 | 2 |
| 2 | 6 |
| 3 | 14 |
| 4 | 30 |
| 5 | 62 |
| 6 | 126 |
| 7 | 254 |
| 8 | 510 |

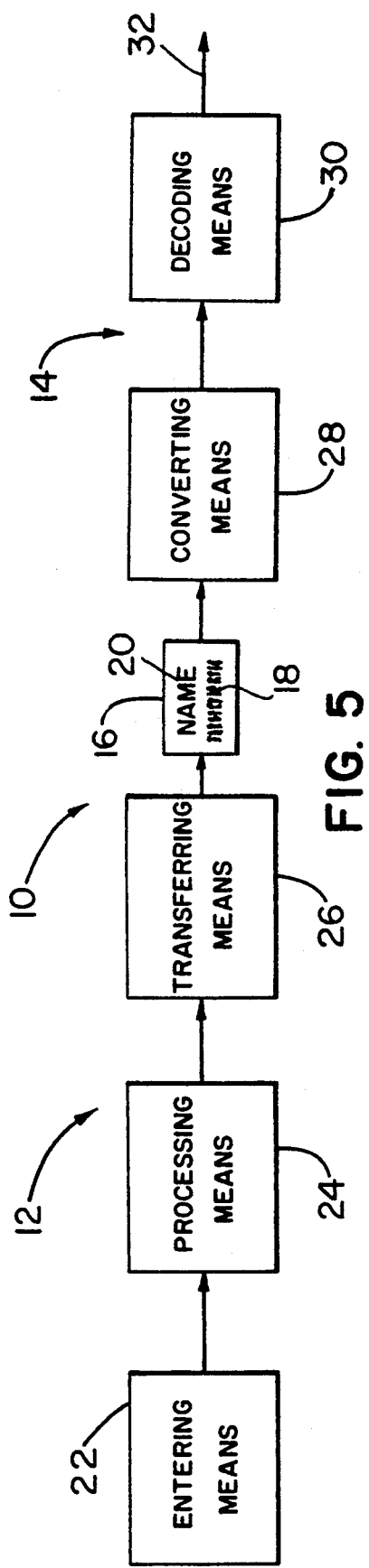
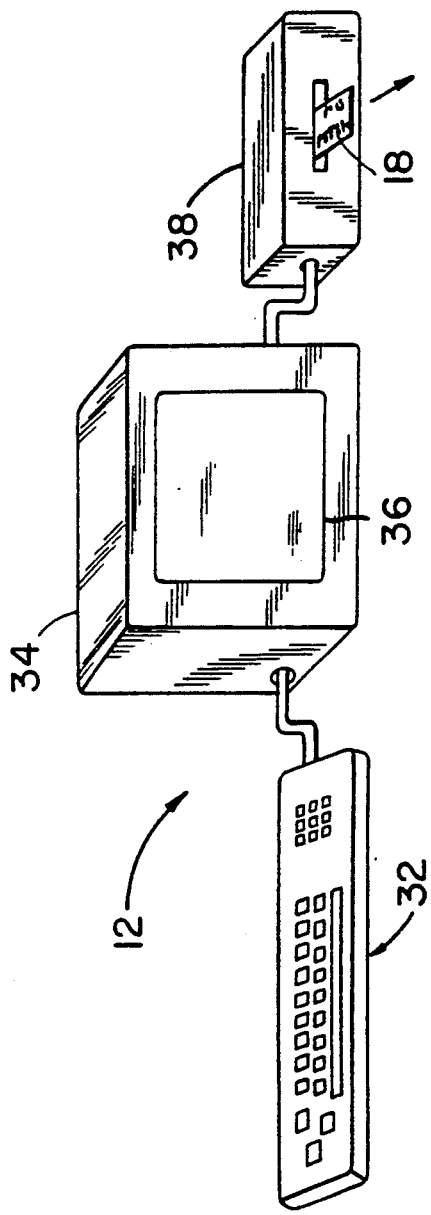

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M |  | L |  | M | H | H |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M |  | L |  | M | H | H |
| ROW | 2 | 2 | 2 | 2 |  | 1 |  | 1 | 1 | 1 |

SYSTEM FOR ENCODING AND DECODING DATA IN MACHINE READABLE GRAPHIC FORM

This application is a continuation-in-part of application Ser. No. 07/653,822, filed Feb. 11, 1991, issued as U.S. Pat. No. 5,113,445 on May 12, 1992, which is a continuation application of application Ser. No. 07/550,023, filed Jul. 9, 1990, abandoned. This application is also a continuation-in-part of application Ser. No. 07/461,881, filed Jan. 5, 1990.

BACKGROUND OF THE INVENTION

The present invention generally relates to the representation of data in machine readable form, and more particularly to a method and apparatus for encoding and decoding data into a two-dimensional graphic image, such as the two-dimensional bar code PDF417, that can be automatically machine read to obtain the encoded data in both open and closed systems.

In today's high-technology world, more and more operations are being automatically performed by machines and systems. This ever-increasing drive for automation has resulted in a demand for new techniques for encoding data into machine readable form for automatic entry into the various systems and machinery. The data entry may be for such uses as data transmission, operating various machine functions or the identification of persons or items. The various media that carry the data for automatic entry include punch cards, magnetic tapes and discs and magnetic stripes on cards such as credit cards and badges. The systems utilizing the above carriers are in "closed" systems, i.e., the read function is performed within an apparatus or housing and the reading element is in contact or in near-contact with the carrier means during the reading operation.

One method for representing data in a machine readable form is to encode the data into a pattern of indicia having parts of different light reflectivity, for example, bar code symbols. A bar code symbol is a pattern comprised of a series of bars of various widths and spaced apart from one another by spaces of various widths, the bars and spaces having different light reflective properties. The bars represent strings of binary ones and the spaces represent strings of binary zeros. Generally, the bars and spaces can be no smaller than a specified minimum width which is called a "module" or "unit." The bars and spaces are multiples of this module size or minimum width.

Bar code symbols are typically printed directly on the object or on labels that are attached to the object. The bar code symbols are read by optical techniques, such as scanning laser beams or CCD cameras, and the resulting electrical signals are decoded into data representative of the symbol for further processing. Bar code reading systems are known as "open" systems in that the carrier while being read is not sealed, but is read from a distance and without being in physical contact with the scanner.

The conventional bar code described above is "one-dimensional" in that the information encoded therein is represented by the width of the bars and spaces, which extend in a single dimension. Thus, a bar code of a supermarket item, for example, consists of a string of eleven digits which represent an identifying number, but not a description of the item. The remainder of the relevant information, such as the price, name of the product, manufacturer, weight, inventory data, and expiration date, must be obtained from a database using the identification number. Similarly, data encoded onto other media such as credit card magnetic stripes is composed of one or more "one-dimensional" tracks of encoded data.

The use of bar code symbols and magnetically encoded data has found wide acceptance in almost every type of industry. However, the one-dimensional nature of the encoded data limits the amount of information that can be encoded and hence use has been generally restricted to simple digital representations.

There is an increasing need, however, for a system to encode data in machine readable form that allows for an increase in the amount of data encoded into a given space that can be quickly and easily decoded for further processing. In particular, there is a desire to create "portable data files" which provide more than an identification number which is then used as an index to reference a database. The "portable data file" approach is well-suited to applications where it is impractical to store item information in a database or where the database is not readily accessible when and where the bar code is read. For example, information such as the contents of a shipping manifest or an equipment maintenance history could be carried directly on the object without requiring access to a remote database. Similarly, a hospital could use portable data files to put more medical information on patient identification bracelets. In a manufacturing environment, portable data files could be used to keep production records or even to provide instructions to control machine operations. Ideally, such portable data files could contain up to several hundred or more characters in a relatively small area, but still be read from a distance by a hand-held laser scanner.

One approach for increasing the information in machine-readable symbols is to reduce the height of the bar codes and stack the bar codes one on top of each other to create a "stacked" or "two-dimensional" bar code. A major problem in reading two-dimensional symbols, however, is the loss of vertical synchronization. As shown in FIG. 1A, if the data rows are too short or the scan line intersects the row at a large angle, the scan lines will not coincide with the horizontal lines of the pattern. The height of the rows can be increased as shown in FIG. 1B, but this causes an obvious reduction of information density.

A proposed solution to the vertical synchronization problem is to include both row identifiers and local row discriminators in the two-dimensional bar code symbol in order to distinguish between the rows. One such two-dimensional bar code with row identifiers and local row discriminators is PDF417, which was developed by Symbol Technologies, Inc. A more complete description of PDF417 is contained in U.S. patent application Ser. No. 07/461,881, filed Jan. 5, 1990, and assigned to the same assignee as the present invention, which is hereby incorporated by reference.

Even if the symbol is constructed so that the rows can be distinguished from one another, however, there remains the problem of how to decode such a symbol efficiently. In particular, it is not enough for a decoding method or apparatus to simply recognize that a scan line crossed a row boundary.

SUMMARY OF THE INVENTION

Accordingly, the present invention is directed to a system for representing and recognizing data in machine readable graphic image form having an increased capacity for encoded information that can be used in both open and closed systems. The system comprises an encoding means having a means for entering data such as a keyboard or optical character scanner. In addition, the data may be obtained directly from computer files. The data entered into the system may be both textual data and control data. The data is entered into a processing means for encoding the data into a two-dimensional pattern of graphic indicia.

The graphic indicia may, for example, be in the form of a two-dimensional bar code which is comprised of a pattern of vertical bars of predetermined lengths that are spaced at various vertical and horizontal intervals. The two-dimensional bar code symbol, which may be a PDF417 symbol, preferably includes a plurality of ordered, adjacent rows of codewords of bar-coded information from a set of codewords, the set of codewords being partitioned into at least three mutually exclusive clusters, each row in the symbol having at least one row indicator codeword and containing only codewords from a cluster different from the codewords in an adjacent row. It should be understood, however, that the graphic indicia representative of the data is not limited to two-dimensional bar codes such as PDF417, but may be in the form of any two-dimensional graphic pattern of indicia suitable for encoding data.

The processing means generates electrical drive signals for transferring the two-dimensional graphic pattern onto a data carrier means, that may be a card or document or the surface of a machine part. The encoding means also includes means for transferring an image of the two-dimensional pattern of graphic indicia onto the data carrier means in response to the transfer drive signals. The image may for example be printed in the form of a two-dimensional pattern of graphic indicia having different areas of light reflectivity in which the indicia have one level of reflectivity and the spaces have another level of reflectivity. In this embodiment, the converting means may be a type of optical scanner typically used for scanning one-dimensional bar codes that converts the areas of different light reflectivity into electrical signals representative of the indicia. Scanners employed in the present invention, however, have the added feature of scanning the indicia in two dimensions. For example, in one method a laser light beam is scanned across the indicia in a raster pattern for reading and decoding two-dimensional graphic codes. Optical scanners suitable for reading two-dimensional patterns are disclosed in U.S. patent application Ser. Nos. 317,433 and 317,533, filed on Mar. 1, 1989, assigned to the same assignee as the present invention and incorporated herein by reference.

The system of the present invention further includes recognition means comprising means for converting the image on the carrier means into electrical signals representative of the graphic indicia and means for decoding the electrical signals into output signals representative of the data.

Where the converting means is a hand-held laser scanner, in order to decode the electrical signals representing the graphic indicia efficiently, the decoding means should be able to decode the signals even though the scan lines cross a row boundary. In particular, where the graphic indicia is a two-dimensional bar code symbol, such as PDF417, which has both row indicators and local row discriminators, the electrical signals obtained from scanning the symbol may be decoded in such a way that partial scans from different rows can be stitched together. This allows greater scanning angles and lower aspect ratios of the rows, which in turn makes possible hand-held laser scanning of two-dimensional bar code symbols.

Accordingly, the decoding means for decoding the two-dimensional bar code symbol, in accordance with the invention, comprises: means for scanning the two-dimensional bar code symbol to produce scan lines of data representing the bar-coded information in the codewords of the symbol; means for decoding a scan line of data into a vector of codeword values corresponding to the codewords that were scanned, at least one of the values being for a row indicator codeword; means for assigning a row number to each of the codeword values in the vector based on the value of the row indicator codeword and the cluster of the codeword; and means for filling in a codeword matrix with the codeword values in the vector according to their assigned row numbers.

In a two-dimensional bar code symbol such as PDF417, the row indicator codewords may also contain information regarding the number of rows in the symbol and the number of codewords in each row. Where this is the case, one embodiment of the decoding means includes both means for decoding a scan line of data to obtain a codeword value for a row indicator codeword, and means for determining either the number of rows or the number of columns from the codeword value corresponding to a row indicator codeword.

The two-dimensional bar code symbol may also contain one or more error correction codewords. Another aspect of the decoding means of the invention therefore includes means for locating in the matrix the codeword values for any codewords that have not been successfully decoded, and means for correcting any erroneous codeword values in the codeword matrix using the error correction codeword.

The decoded output signals are available for further processing and the system may therefore include means for outputting the decoder output signals. Typical output devices may include a liquid crystal display, a CRT display and a printer. The outputted signals may also be transmitted to a computer or other system for further processing and use via telephone lines using a modem or via a data bus. The present invention contemplates the outputting of the decoder output signals to a microprocessor for controlling the operation of various machines such as facsimile, VCR, microwave oven, robotic systems and weight/price label scale devices.

In another embodiment of the invention, the processing means encodes a first set of data into the two-dimensional pattern of graphic indicia and generates first transfer drive signals for transferring the two-dimensional pattern onto a carrier means. The processing means also generates a second set of transfer drive signals in response to a second set of data entered into the system intended to be transferred to the carrier means in human readable form. Thereafter, the transfer means transfers onto the carrier means both the image of the two-dimensional graphic pattern of indicia in response to the first transfer drive signals and the second set of data in human readable form in response to the second transfer drive signals. Thus, the system provides means for automatically representing data in both a machine readable form and human readable form onto a single carrier means.

In yet another embodiment of the invention, the data is encoded and decoded using a keyed data encryption technique in order to increase the security of the data transmission. In this embodiment, only the person having the encryption key will be able to decode the graphic pattern.

The system of the present invention maximizes the use of available space for encrypting data. In addition to being compact in size, the system provides for high security in the transmission of information. Thus, the invention provides a highly reliable system for representing data in machine readable graphic form having increased encoding capacity thereby substantially expanding applications for automatic data entry. In addition, the invention creates a new media for man-machine interfacing.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

FIG. 5 is a block diagram of the system of the present invention;

FIG. 6 is a perspective view of an encoding means of the system of the present invention;

DESCRIPTION OF THE PREFERRED EMBODIMENTS

Reference will now be made in detail to the presently preferred embodiments of the invention, examples of which are illustrated in the accompanying drawings.

Code PDF417

Before discussing the method and apparatus of the invention for encoding and decoding data in machine readable graphic form, such as the two-dimensional bar code PDF417, it is important to understand the structure of the two-dimensional bar code symbol itself.

Each PDF417 symbol is composed of a stack of rows of bar-coded information. Each row in the symbol consists of a start pattern, several symbol characters called "codewords," and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 1A:
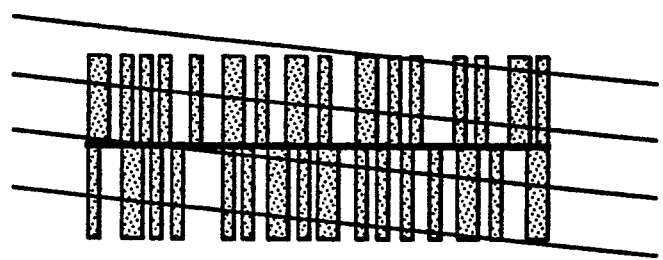
FIGS. 1A and 1B are diagrams illustrating the intersection of scan lines with the rows of a two-dimensional bar code symbol.
Figure 1B:
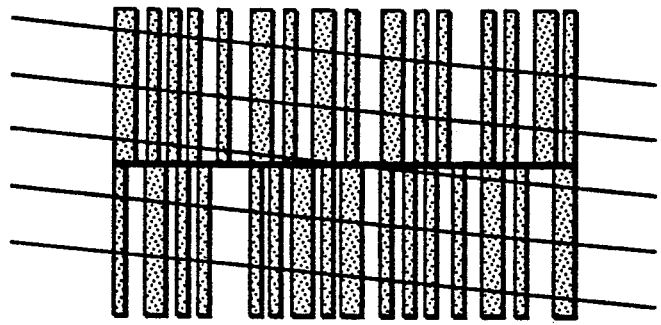
Figure 2:
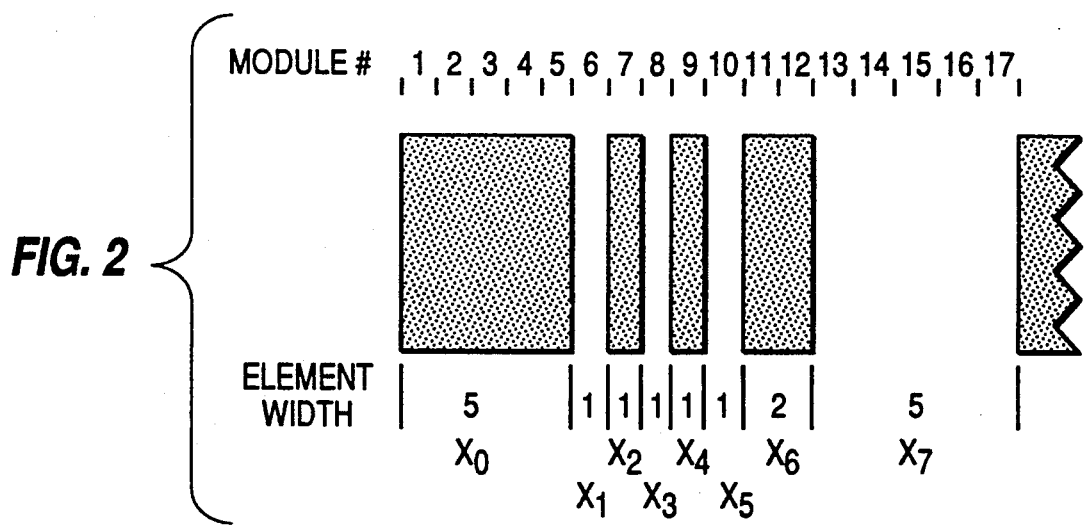
FIG. 2 is a diagram illustrating one example of a codeword in PDF417.

Each PDF417 codeword consists of seventeen modules or units. There are four bars and four spaces in each codeword. Individual bars or spaces can vary in width from one to six modules, but the combined total per codeword is always seventeen modules. Thus, each codeword can be defined by an eight-digit sequence, which represents the four sets of alternating bar and space widths within the codeword. This is called the "X-sequence" of the codeword and may be represented by the sequence $X_0, X_1, \ldots X_7$. For example, for an X-sequence of "51111125", the first element is five modules wide, followed by five elements one module wide, one element two modules wide, and the last element five modules wide. This example is illustrated in FIG. 2.

The set of possible codewords is further partitioned into three mutually exclusive subsets called "clusters." In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

cluster number $= (X_0 - X_2 + 30 X_4 - X_6) \bmod 9$ where "mod 9" is the remainder after division by nine. Referring to the codeword in FIG. 2, the cluster number is calculated as follows:

cluster number = (5 − 1 + 1 − 2) mod 9 = 3

To minimize error probabilities, PDF417 uses only three clusters, even though nine are mathematically possible. Thus, each row uses only one of the three clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

cluster number = ((row number) mod 3) * 3

There are 929 codeword values defined in PDF417. These values are 0 through 928. Each cluster presents the 929 available values with distinct bar-space patterns so that one cluster cannot be confused with another.

Figures 3, 4:
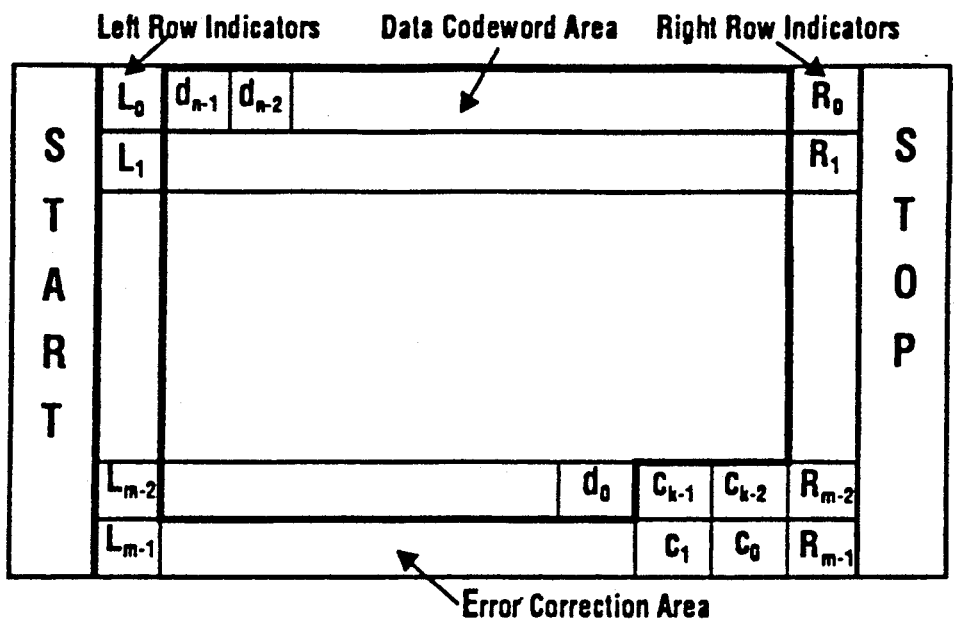
FIG. 3 is a diagram illustrating the overall structure of a PDF417 symbol.
FIG. 4 is a table listing the number of error correction codewords for a given security level in PDF417.

FIG. 3 is a block diagram showing the overall structure of a PDF417 symbol. Each row of the symbol consists of a start pattern, a left row indicator codeword $L_i$, data codewords $d_i$ or error detection/correction codewords $C_i$, a right row indicator codeword $R_i$, and a stop pattern. The minimum number of codewords in a row is three, including the left row indicator codeword, at least one data codeword, and the right row indicator codeword. The right and left row indicator codewords, which are discussed further below, help synchronize the structure of the symbol.

The start and stop patterns identify where each row of the symbol begins and ends. PDF417 uses unique start and stop patterns. The start pattern, or left side of each row, has the unique pattern, or X-sequence, of "81111113". The stop pattern, or right side of each row, has the unique X-sequence of "711311121".

Every symbol contains one codeword (the first data codeword in row 0) indicating the total number of codewords within the symbol, and at least two error-detection codewords $C_0$ and $C_1$. These two error-detection codewords together form a checksum which is two codewords long.

A PDF417 symbol can also encode data with error correction capability. The level of error correction capability, called the "security level," is selected by the user and ranges from 0 to 8. This means, for example, that at level 6, a total of 126 codewords can be either missing or destroyed and the entire symbol can be read and decoded. FIG. 5 is a table showing the relationship between the security level of the PDF417 symbol and the number of error correction codewords $C_i$.

In addition to correcting for missing or destroyed data (known as "erasures"), PDF417 can also recover from misdecodes of codewords. Since it requires two codewords to recover from a misdecode, one to detect the error and one to correct it, a given security level can support half the number of misdecodes that it can of undecoded codewords.

The row indicator codewords in a PDF417 symbol contain several key components: row number, number of rows, number of data columns, and security level. Not every row indicator contains every component, however. The information is spread over several rows, and the pattern repeats itself every three rows. The pattern for encoding the information in the row indicator codewords can be illustrated as follows:

| Row 0: | $L_0$ (row #, # of rows) | $R_0$ (row #, # of columns) |
|---|---|---|
| Row 1: | $L_1$ (row #, security level) | $R_1$ (row #, # of rows) |
| Row 2: | $L_2$ (row #, # of columns) | $R_2$ (row #, security level) |
| Row 3: | $L_3$ (row #, # of rows) | $R_3$ (row #, # of columns) |
| etc. | | |

In other words, the left row indicator codeword $L_0$ for the first row 0 contains the row number (0) and the total number of rows in the symbol. The right row indicator codeword $R_0$ for row 0 contains the row number (0) and the number of data columns in the symbol, and so on.

Encoding data into a PDF417 symbol is typically a two-step process. First, data is converted into codeword values of 0 to 928, which represent the data. This is known as "high-level encoding." The values are then physically represented by particular bar-space patterns, which is known as "low-level encoding."

Encoding/Decoding System

Figure 7:
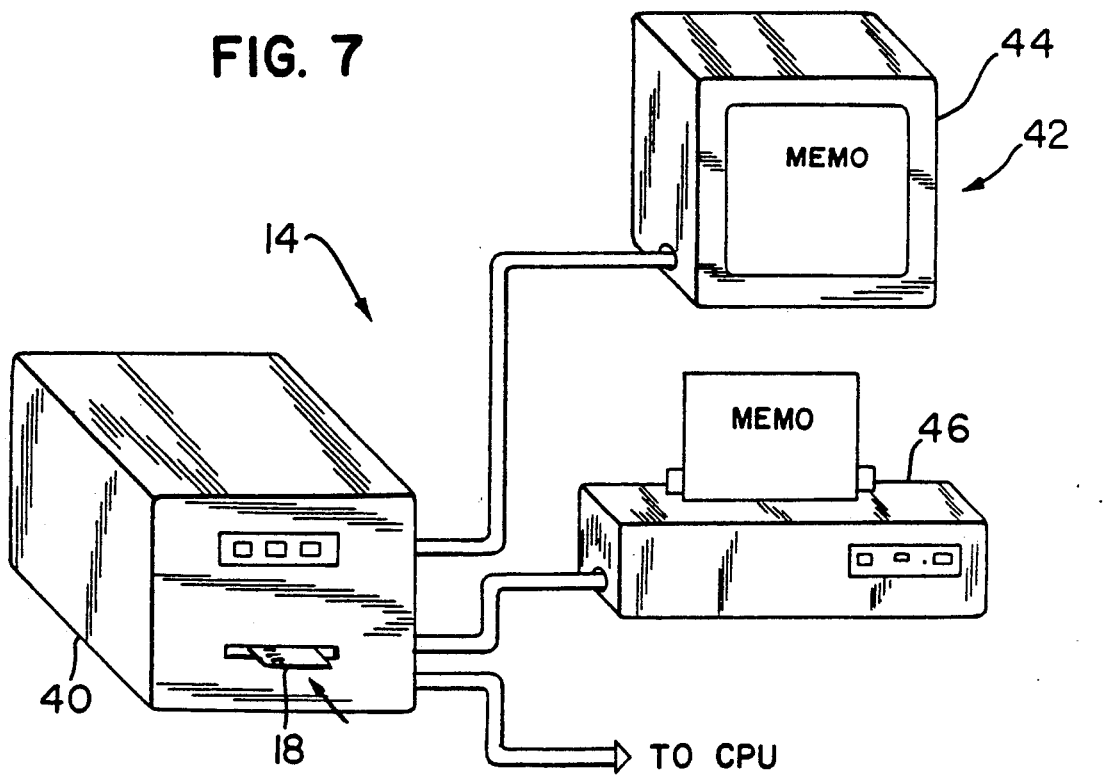
FIG. 7 is a perspective view of a recognition means of the system of the present invention.

Referring now to FIGS. 5–7 in the drawings, FIG. 5 is a block diagram of the system 10 of the present invention for representing and recognizing data in machine readable graphic image form. System 10 includes an encoding means generally indicated by the reference numeral 12 and a recognition means generally indicated by the reference numeral 14. Encoding means 12 produces a carrier means 16 containing at least a two-dimensional pattern of graphic indicia 18. Carrier means 16 may also contain human readable data 20. The two-dimensional pattern of graphic indicia on carrier means 16 is recognized by recognition means 14 to produce output signals representative of the data encoded into the pattern 18.

Data to be transferred onto carrier means 16 is entered by entering means 22 into the encoding means 12. The data entered by entering means 22 may be both the data to be encoded into the two-dimensional pattern of graphic indicia and the data to appear on carrier means 16 in human readable form. Processing means 24 encodes the set of data to appear in pattern 18 into a two-dimensional pattern of graphic indicia and generates transfer drive signals for controlling the transfer of the indicia onto the carrier means 16. Transferring means 26 transfers an image of the two-dimensional pattern of graphic indicia onto carrier means 16 in response to the transfer drive signals. If human readable data is also to be transferred onto carrier 16, the processing means 24 generates a second set of transfer drive signals for controlling the transfer of the human readable data onto carrier 16. A portion or all of the data to be encoded and the human readable data may be transferred from a storage memory in processing means 24 or other computer files rather than being entered by means 22.

The carrier means 16 shown in FIGS. 5, 6, and 7 is represented as being in the form of a card approximately the size of a credit card. This type of card is illustrative only as the carrier means 16 may be made of any material on which graphic indicia may be transferred to, such as paper, etc.

Recognition means 14 includes converting means 28 that converts the image on carrier means 16 into electrical signals representative of the graphic indicia. Decoding means 30 decodes the electrical signals into decoder output signals indicated at 32 that are representative of the data encoded into the pattern 18.

FIG. 6 is a perspective view of one embodiment of encoding means 12. In this embodiment, the entering means 22 of FIG. 5 is shown in form of a keyboard 32 for entering alphanumeric and graphic data into the encoding means 12. The embodiment of FIG. 6 is illustrative only as entering means 22 may take forms other than a keyboard such as an optical scanning means for scanning data directly from documents for entry into the encoding means 12. Entering means 22 may also be in the form of various card readers in which magnetically encoded information is scanned and converted into electrical signals representative of the data.

Referring again to FIG. 6, the processing means 24 of FIG. 5 is shown in the form of a processor and display unit 34. The data entered by keyboard 32 is transmitted to the processor and display unit 34 for storage and processing. In addition to entering data, the keyboard 32 is also used for entering control commands to effect operation of the processor unit 34.

The data entered by keyboard 32 is displayed on display screen 36 and upon entry of a proper control command, is also stored in memory. The data to be encoded into the pattern of graphic indicia is stored in a first memory, in processor 34 and the data, if any, to be transferred in human readable form is stored in a second memory. Alternatively, the data may be stored in a separate portion of a single memory. Upon the appropriate control command from keyboard 32, the processor unit 34 encodes the data in the first memory into a two-dimensional pattern of graphic indicia and generates first transfer drive signals representative of the data stored in the first memory. The processor unit 34 also generates second transfer drive signals representative of the data stored in the second memory.

The processor unit 34 is shown in FIG. 6 as being coupled to a printer 38. The printer 38 is one form of the transferring means 26 of FIG. 5. Printer 38 transfers an image of the two-dimensional pattern of graphic indicia on carrier means 18 in response to the first transfer drive signals and prints the second set of data in human readable form onto carrier means 18 in response to the second transfer drive signals. In one embodiment, the printer 38 prints the two-dimensional pattern in the form of graphic indicia having different areas of light reflectivity, such as the two-dimensional bar code described above. Printer 38 may take other forms such as a means for printing the two-dimensional pattern of graphic indicia with magnetic-ink. In such a device, magnetic indicia are deposited on the carrier material in a two-dimensional pattern that may be recognized by magnetic-ink recognition sensors.

Turning now to FIG. 7, the recognition means 14 includes a card reader 40 which contains the converting means 28 and the decoding means 30 of FIG. 5. The converting means 28 may be a bar code reader such as those disclosed in U.S. patent application Ser. Nos. 317,433 and 317,533, assigned to the same assignee as the present invention and incorporated herein by reference. The readers disclosed in the above patent applications are open system devices designed to read an optically encoded two-dimensional bar code and to convert the light reflected from the pattern into electrical signals representative of the graphic indicia.

The card reader 40 may also comprise a magnetic-ink recognition device for reading and decoding magnetically encoded data. These closed system devices include a magnetic read head that senses the change in reluctance associated with the presence of the magnetic-ink. The use of appropriate converting means that corresponds to the particular data encoding technology employed is contemplated by the present invention.

The decoding means 30 decodes the electrical signals into output signals representative of the data encoded onto carrier means 18. The decoder output signals are outputted from the recognition unit 40 to various output means 42. FIG. 7 depicts two examples of output devices, one being a display unit 44 and the other a printer 46. Display unit 44 may be any suitable display such as liquid crystal display or a CRT. The printer 46 may be any print device such as a dot matrix printer, laser printer, etc.

The system of the present invention maximizes the use of available space for encrypting data. The density of the encoded data is such that for a two-dimensional bar code symbol, a minimum of about 1600 characters can be encoded into a space of approximately $5'' \times \frac{1}{2}''$. In addition to being compact in size, the system provides for high security in the transmission of information. For example, a sensitive message may be encoded onto a document also containing non-sensitive material. This document, the same as any document, can be copied, transmitted by facsimile, etc., but only those with a recognition means of the present invention will be able to "read" the sensitive portion. The carrier means, being a single sheet of paper or a plastic credit card type of card, is an inexpensive read-only-memory structure that facilitates data communication.

Figure 8:
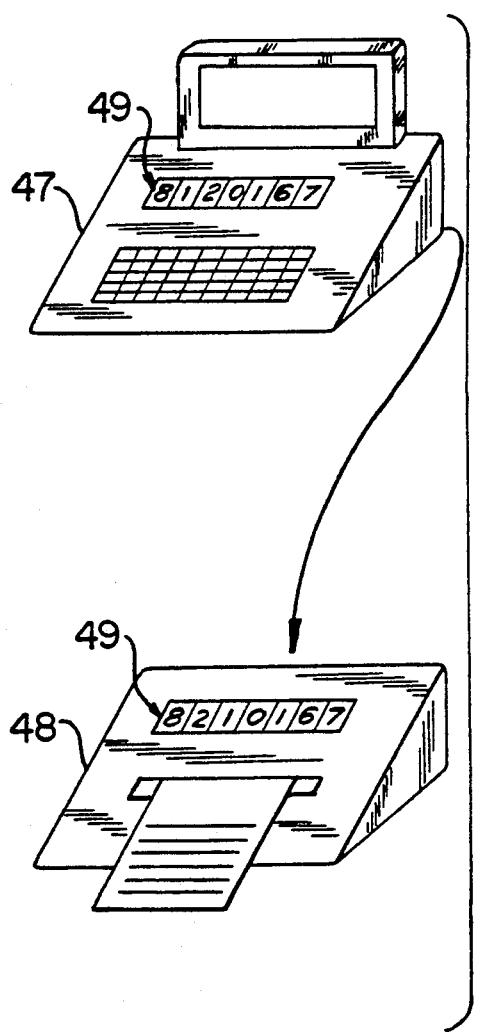
FIG. 8 is a perspective view of a data entry device and reader in which a key may be entered for encrypting and decrypting data.

In another embodiment, the data may be encoded using a keyed encryption algorithm that may be accessed only by an encryption key. As shown in FIG. 8, the data entry means 47 contains the keyed algorithm and upon entry of the key 49, the data will be encoded into a two-dimensional graphic pattern in a unique configuration. The unique configuration can only be read by a reader 48 having the algorithm and only upon entry of the key 49 into the reader. Thus, a high degree of security may be provided with the keyed encryption embodiment.

In addition, the recognition unit 40 may also transmit the output signals to a central processing unit locally or remotely, by for example a modem, for further use or processing by the CPU. In this embodiment, the data encoded onto the carrier means 18 may be control data in the form of machine operating instructions for controlling a robotic system or to a security identification system for performing such functions as unlocking doors. In connection with the use of the present invention in a robotic system, it is contemplated that the two-dimensional graphic pattern containing the control data be placed or printed directly onto a machine part or part holder. A scanner coupled to the machine tool reeds the pattern and transmits the decoded instruction to the control computer which in turn controls the machining of the part in accordance with the control program. Another example of the use of the present invention includes a microwave food container where the two-dimensional graphic pattern contains instructions automatically entering the recommended cooking sequence. A further use may be in connection with placing on roadway signs two-dimensional patterns containing geographic location information that may be read by a scanner in passing vehicles for use with on-board computers.

Figure 9:
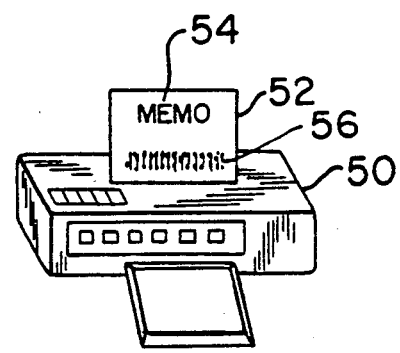
FIG. 9 is a perspective view of a facsimile machine incorporating the recognition means of the present invention.

The present invention further contemplates the use of the system of the present invention to encode control data containing machine operating instructions onto the carrier means in the form of machine readable graphic indicia that may be inserted into the machine to effect operation of the machine. FIG. 9 is an example of a facsimile machine 50 in which a document 52 containing human readable data 54 and a two-dimensional pattern of graphic machine readable indicia 56. The document 52 is inserted into the facsimile machine 50 the same as documents are normally inserted for transmission. The machine 50 contains a converting means for converting the two-dimensional image into electrical signals and a decoding means for decoding the signals into output signals operative to actuate the facsimile machine 50. The pattern 56 may contain such information as the phone number of the intended recipient of the memo 54 and the appropriate instructions for automatically entering the phone number and actuating the transmission process. Thus, where numerous messages are faxed to a particular recipient, a supply of paper containing the phone number of the recipient encoded in the two-dimensional graphic indicia machine readable format may be maintained by the sender. The transmission of messages to that recipient will be facilitated by placing the message onto the pre-encoded paper and simply inserting the paper into the facsimile machine. In addition to simplifying and speeding the transmission process, the possibility of sending highly sensitive information to an incorrect party will also be eliminated.

Scanning/Decoding Apparatus

Figure 10:
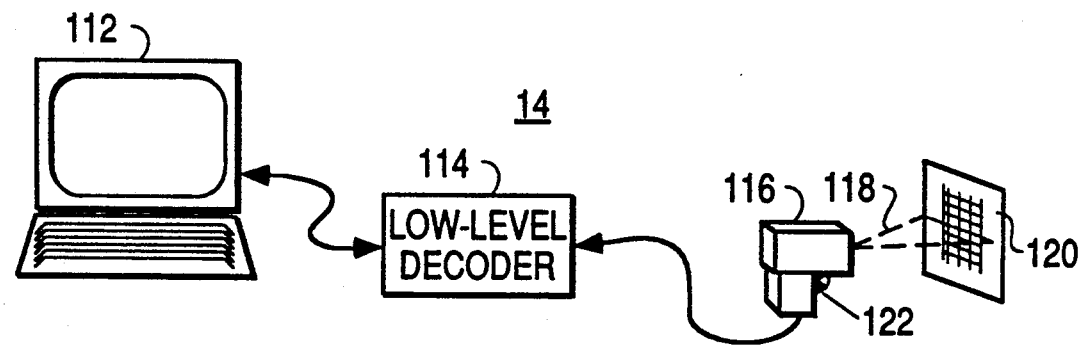
FIG. 10 is a schematic diagram of another embodiment of recognition means for scanning and decoding a two-dimensional bar code symbol.

Referring now to FIG. 10, there is illustrated a further embodiment of the recognition means 14 for scanning and decoding graphic indicia in machine readable form, where that graphic indicia is in the form of a two-dimensional bar code symbol such as PDF417. As shown in FIG. 10, the recognition means 14 includes a host computer 112, which may be a personal computer, a low-level decoder 114, and a hand-held laser scanner 116. Scanner 116 uses a laser light beam 118 to scan a two-dimensional bar code symbol 120 in a raster pattern while a trigger 122 is pulled. A laser scanner suitable for scanning a two-dimensional bar code symbol is disclosed in U.S. patent application Ser. No. 07/317,433 filed Mar. 1, 1989, and assigned to the same assignee as the present invention, which is hereby incorporated by reference.

Electrical signals from laser scanner 114 are transmitted to low-level decoder 114 where they are decoded into a matrix of codeword values corresponding to the rows and columns of the two-dimensional bar code symbol. As explained in further detail below, low-level decoder 114 may be embodied in a computer program operating on a micro-computer separate from the host computer. The low-level decoder is connected to the host computer by a standard interface, such as an RS-232 interface, for transmitting the codeword values after they are decoded. Alternatively, the low-level decoder 114 may be embodied entirely in hardware, or a combination of a hardware and software, which is physically located in either the scanner itself or the host computer.

The matrix of codeword values from low-level decoder 114 is decoded into usable data by a high-level decoder, which may be embodied as a separate computer program operating on the host computer 112. For example, PDF417 has three predefined modes and nine reserved modes. The predefined modes are Binary, EXC, and Numeric. In the Binary mode, each codeword can encode 1.2 bytes. In the EXC mode, the alphanumeric data can be encoded in double density (i.e., two characters per code word), and in Numeric mode, the numeric data can be packed in almost triple density. Therefore, the high-level decoder in host computer 112 will further decode the codeword values (0-928) from low-level decoder 114, depending on the mode, to obtain the actual data embodied in the symbol. The decoded data from the high-level decoder may then be used by a user application program also operating on the host computer 112.

Low-Level Decoder

Figure 11:
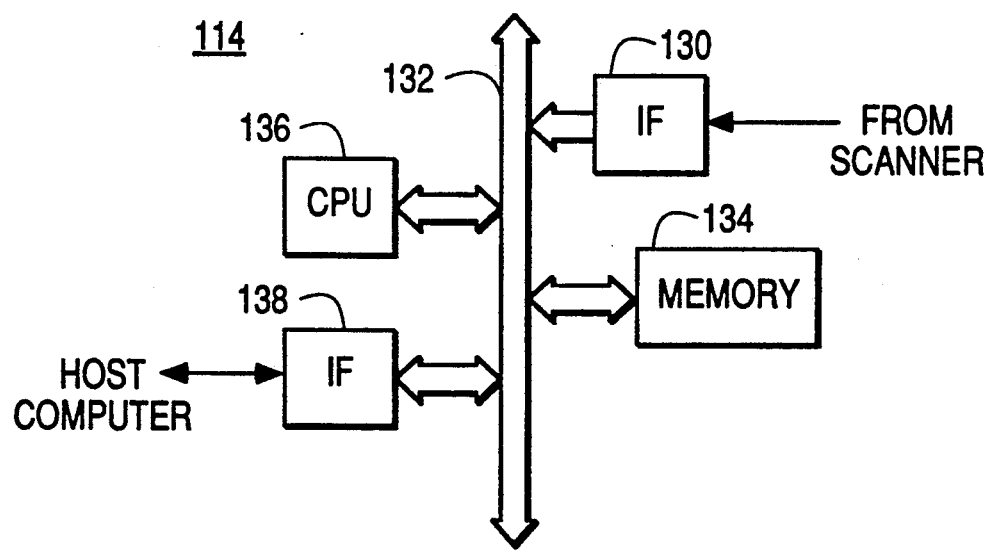
FIG. 11 is a schematic block diagram of an embodiment of the hardware apparatus of a low-level decoder for decoding a two-dimensional bar code symbol.

FIG. 11 is a schematic block diagram of one embodiment of the hardware apparatus of low-level decoder 114 shown in FIG. 10. In this embodiment, the low-level decoder is primarily embodied in a computer program which is executed by a microcomputer separate from the host computer.

As shown in FIG. 11, the low-level decoder includes a scanner interface 130 which receives the electrical signals from the scanner. The electrical signals from the scanner may be in the form of a digital signal which corresponds to the light and dark elements of the symbol as it is being scanned. Scanner interface 130 converts the electrical signals into a sequence of integer values representing the varying widths of the bars and spaces and stores them in a buffer area of a memory 134. In order to accomplish this, scanner interface 130 is connected to a central bus 132 to which the other hardware elements of the low-level decoder are also connected. Scanner interface 130 has direct memory access (DMA) capability which allows it to store the converted scanner data directly in the memory for decoding.

Low-level decoder also includes a central processing unit (CPU) 136 and a second interface 138 for communicating with the host computer. The interface to the host computer may be one or more standard interfaces such as an RS-232 interface.

Figure 12:
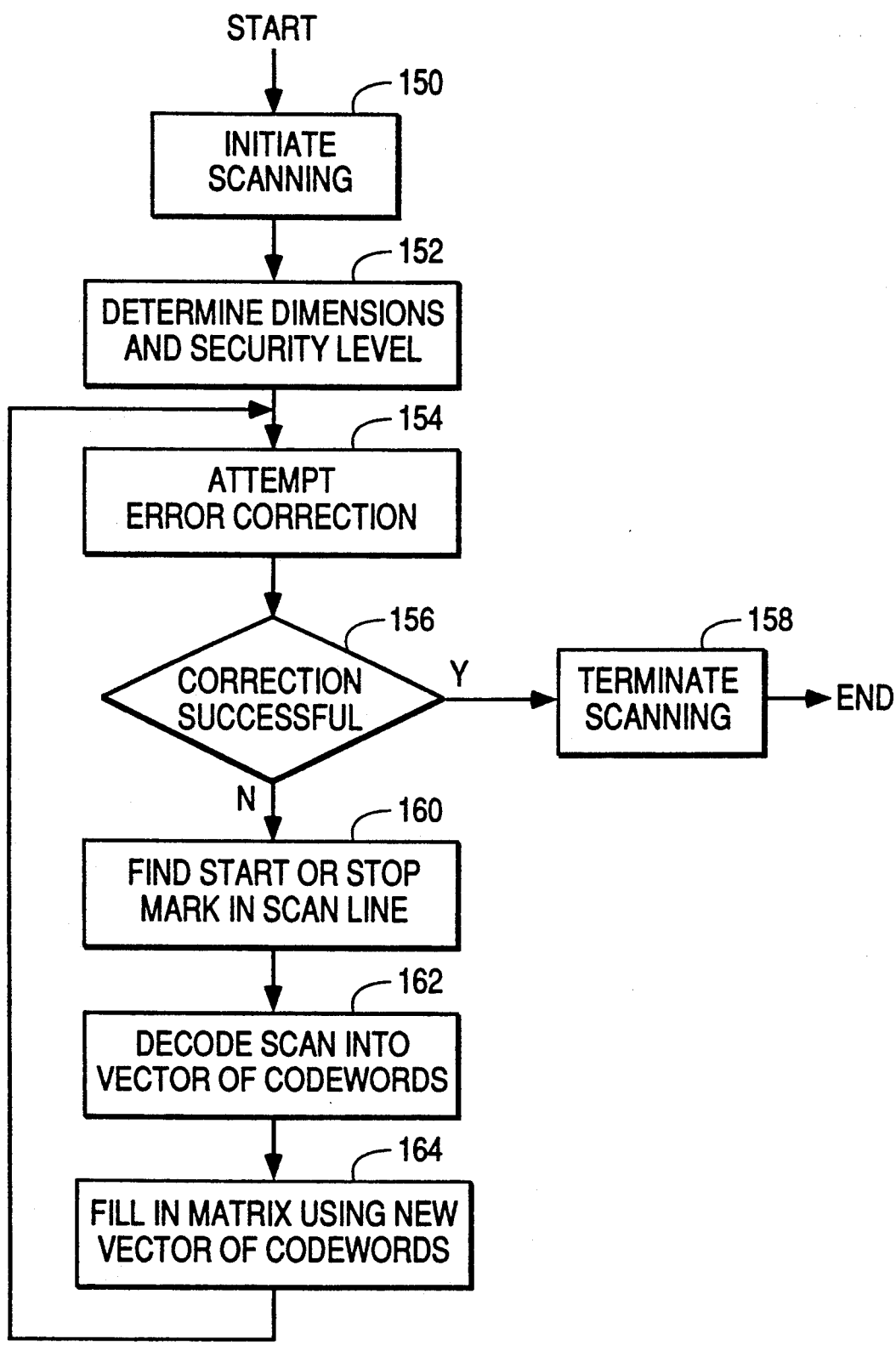
FIG. 12 is a flow diagram of the steps performed by the low-level decoder for decoding a two-dimensional bar code symbol.

FIG. 12 is a flow chart showing the sequence of operation of the low-level decoder for decoding a two-dimensional bar code symbol such as PDF417 into a matrix of codeword values. The various steps in the sequence are embodied in a software computer program which is stored in memory 134 and executed by CPU 136 shown in FIG. 11.

In the first step 150 in FIG. 12, the low-level decoder initializes the scanner interface and initiates scanning of the symbol. The actual functions performed in this step will depend on the type of scanner and will involve various scanner dependent routines to initialize the scanner interface and to start scanning.

In step 152, the low-level decoder attempts to determine the dimensions and the security level of the symbol being scanned. Specifically, this step determines the number of rows, the number of data columns, and the security level of the symbol from the left and right row indicator codewords. These dimensions are then used to initialize a two-dimensional codeword matrix and other related parameters for decoding the symbol. Each location in the matrix contains both a codeword value and an associated confidence weight, which are initially set to a null or empty value. If the dimensions and security level of the symbol cannot be determined, then the scan is aborted. This step will be discussed in further detail below in connection with FIG. 13.

Continuing in FIG. 12, step 154 is the first step in a control loop in which the rows of the two-dimensional bar code symbol are repeatedly scanned and the codeword values are filled into the codeword matrix. The steps of the control loop are each repeated until the number of codewords remaining in the matrix which have not been successfully decoded is small enough that rest of the matrix can be determined using the built-in error correction capability of the symbol. Thus, in step 154, if the number of codewords which have not been successfully decoded is less than the error correction capability of the symbol based on the security level (see FIG. 4), an attempt is made to correct the matrix using the error-correction codewords. If the attempted error correction is successful, then in step 156, the control loop is exited and scanning is terminated in step 158. Otherwise, if the attempted error correction is not successful, then the following steps 160-164 are performed to try to decode additional codewords to fill in the matrix.

First, step 160 searches a scan line of data obtained from the buffer area of the memory for a start or a stop pattern. If either a start or a stop pattern is found, then in step 162, the low-level decoder attempts to decode as many codewords as possible from the scan line. Specifically, the scan line of data is parsed into individual codewords whose values and cluster numbers are placed in a codeword vector ready for incorporation into the codeword matrix. Both steps 160 and 162 are discussed in further detail below in connection with FIGS. 14 and 16, respectively.

The codeword vector produced in step 162 is analyzed and then used to update the codeword matrix in step 164. In particular, step 164 assigns a confidence weight to each codeword value depending on whether its nearest neighbors were also decoded. Row numbers are also assigned to each codeword value based on the left or right row indicator codewords and the corresponding cluster number for the codeword. If the scan line crosses a row boundary, the cluster numbers of the codewords can be used to determine the correct row number for each individual codeword. For example, if a decoded scan line has a left row indicator with row number 2, and the cluster numbers of the following codewords are 6, 0, 0, 3, the codewords are accordingly placed in the following locations: (row 2, column 1); (row 3, column 2); (row 3, column 3); and (row 4, column 4). In this way, a single scan line of data can contain codewords from more than one row, which can then be stitched into the appropriate location in the codeword matrix. This step is discussed in further detail in connection with FIGS. 19A and 19B below.

Figure 13:
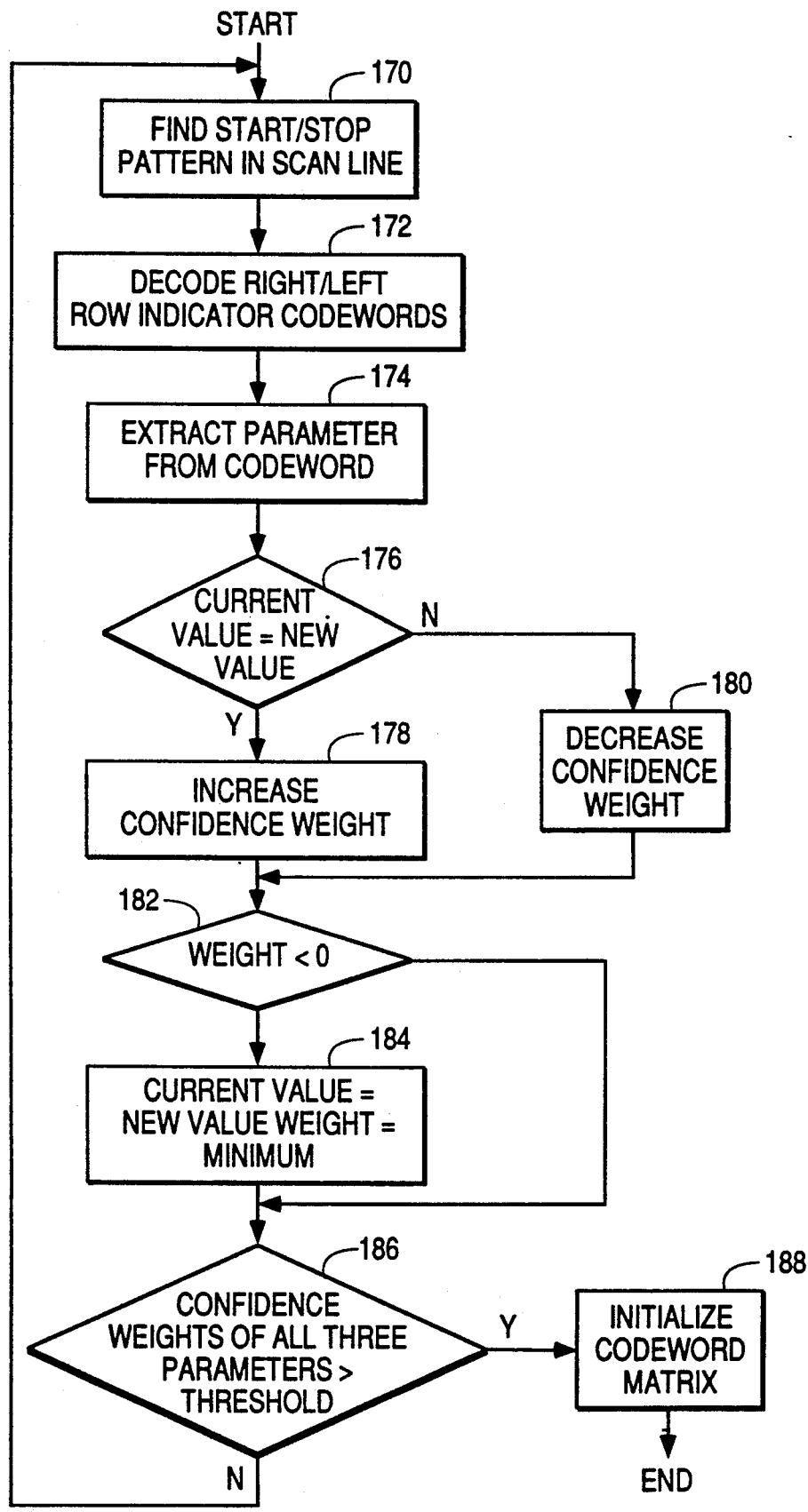
FIG. 13 is a flow diagram of the steps performed by the low-level decoder for determining the dimensions and security level of the symbol being scanned.

FIG. 13 is a flow chart showing in greater detail the sequence of steps for determining the dimensions and security level of a symbol as referred to in step 152 of FIG. 12 above. In the first step 170 of FIG. 13, the low-level decoder searches a scan line of data obtained from the buffer area of the memory for a start or a stop pattern. This step is the same as step 160 in FIG. 12 and is discussed in further detail in connection with FIG. 14 below.

Step 172 then decodes the first codeword immediately adjacent to either the start or stop pattern found in the previous step. As shown in FIG. 3, this codeword will be either a left or right row indicator codeword containing the row number and either the number of rows, the number of data columns, or the security level of the symbol. If both a start and a stop pattern are found, then both the left and the right row indicators are decoded. The sequence of steps for decoding an individual codeword are discussed further below in connection with FIG. 18.

Continuing in FIG. 13, in step 174 the particular dimension or security level encoded in the row indicator is extracted from the codeword value and the cluster number determined in the previous step 172. For example, for a left row indicator codeword with a cluster number of 0, the number of rows is extracted from the codeword value.

A confidence weight assigned to each of the dimensions and the security level is initially set to 0. Steps 176-184 update both the current value and the confidence weight of the dimension or security level extracted in the previous step in the following way. First, the particular parameter, say the number of rows, is compared to the current value of the number of rows obtained from previous decodes. If the current value of the number of rows and the newly decoded value are the same, as determined in step 176, then the confidence weight assigned to the number of rows is increased in step 178. If the current value and the newly decoded value are different, however, then the confidence weight is decreased in step 180. If the confidence weight assigned to the particular parameter is decreased below zero as determined in step 182, then the newly decoded value is substituted for the current value and a new minimum weight is assigned to the parameter in step 184.

Step 186 determines whether the confidence weight for all three parameters, i.e., number of rows, number of data columns, and security level, exceeds a predetermined threshold. If so, then the two-dimensional codeword matrix is initialized in step 188 based on the current values of the number of rows and the number of columns. The number of correctable errors may also be determined from the current value of the security level according to the table in FIG. 4. If all three confidence weights do not exceed the threshold in step 186, however, then program control returns to step 170 to begin searching for the start and stop patterns in a new scan line. Steps 170-184 are repeated until all three parameters have been successfully decoded with a high degree of confidence.

Figure 14:
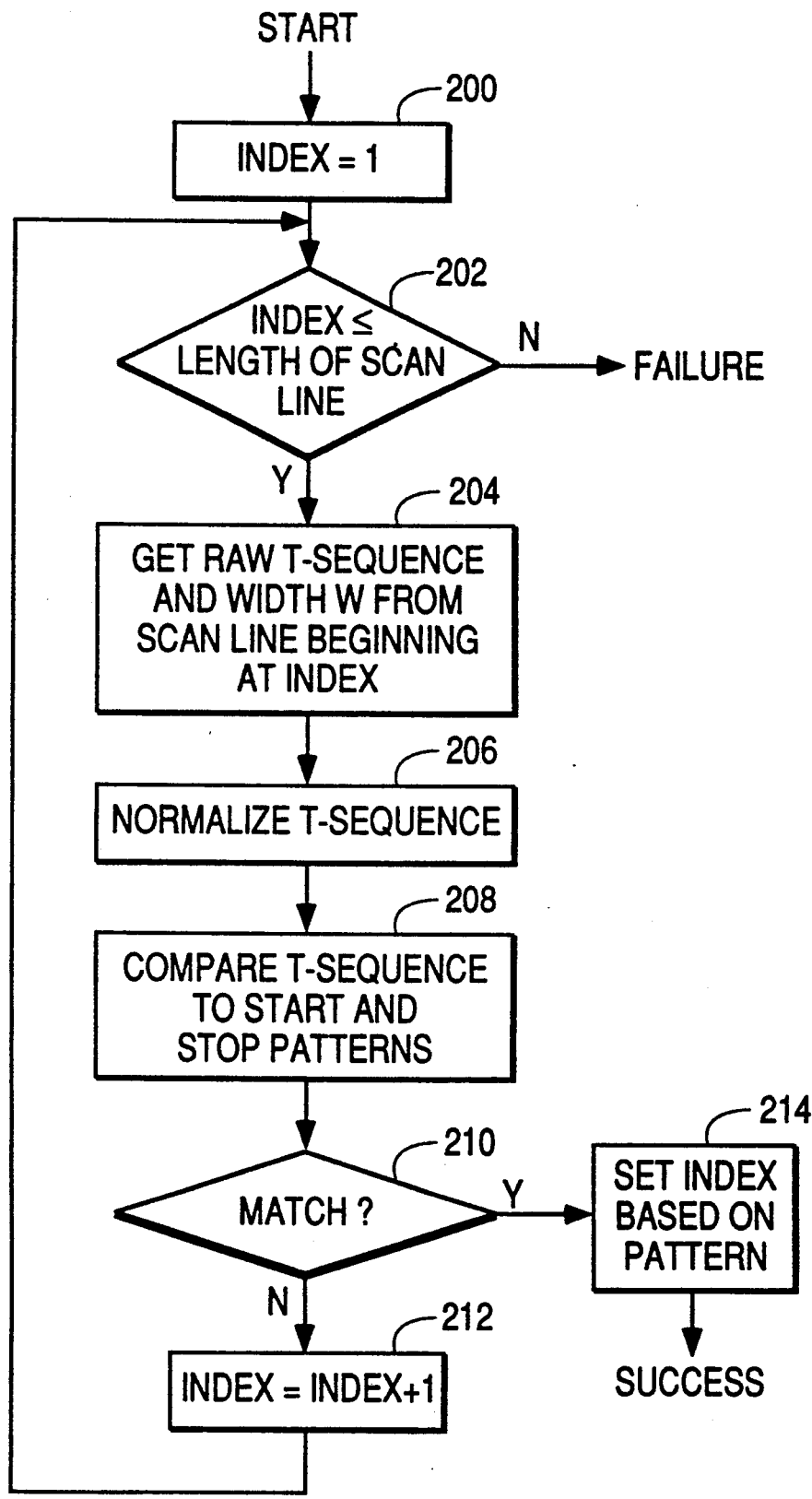
FIG. 14 is a flow diagram of the steps performed by the low-level decoder for searching a scan line of data for a start or a stop pattern.

FIG. 14 is a flow chart showing in greater detail the sequence of steps for searching a scan line of data for a start or stop pattern as referred to above in step 160 of FIG. 12 and step 170 of FIG. 13. Briefly, the search begins at the first location of an individual scan line of data obtained from the buffer area of the memory and is repeated at sequential locations until either a match is found or the length of the scan line is exceeded. When a match is found, an index is set to a location immediately following or preceding the pattern for decoding the adjacent code word.

As shown in FIG. 14, the first step 200 sets an index to the location of the data elements in the scan line to "1", indicating the first data element or integer value of the scan line. This index is used to identify the first element of each sequence of eight elements in the scan line for comparison to the start and stop patterns.

Step 202 is the first step of an iterative loop for searching the scan line from left to right for either a start or a stop pattern. In this step, if the current index is less than the length of the scan line, then the remaining steps are executed and the search continues. Once the index exceeds the length of the scan line, however, then the loop is exited and an indication is returned signifying that the search failed and a start or stop pattern was not found.

Figures 15, 17A, 17B, 17C:
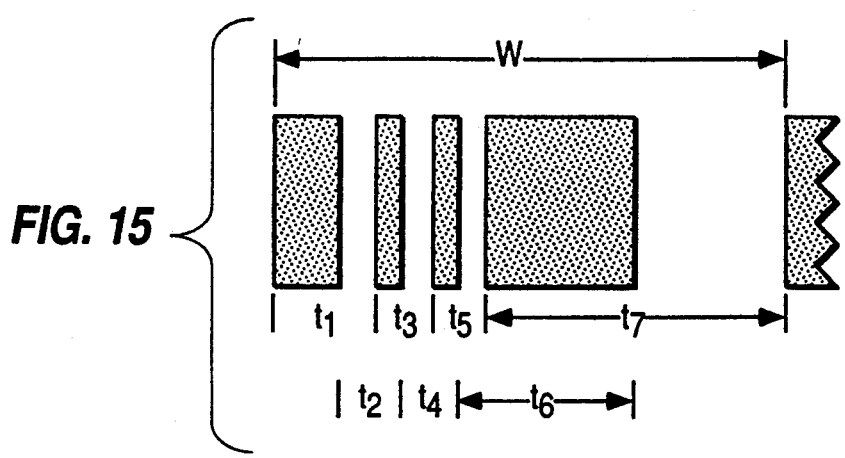
FIG. 15 is a diagram illustrating the various width measurements that are used for the "t-sequence" of a codeword.
FIGS. 17A, 17B, and 17C are diagrams showing an example of a codeword vector.

Rather than using the X-sequence of codeword, the low-level decoder decodes a symbol by using "edge to similar edge" measurements to compensate for ink spreading which occurs when printing the symbols. Thus, in step 204, a raw "t-sequence" is obtained from the scan line by adding pairs of consecutive integer values beginning at the location specified by the index. Specifically, the raw t-sequence, which corresponds to the seven width measurements $t_1, t_2, \ldots t_7$ shown in FIG. 15, is calculated by adding pairs of the consecutive integer values $x_0, x_1, \ldots x_7$, representing the widths of the bars and spaces, as follows:

$$t_1 = x_0 + x_1$$

$$t_2 = x_1 + x_2$$

$$t_3 = x_2 + x_3$$

etc

A width W for the entire codeword is also calculated in step 204 by summing the eight integer values $x_0 + x_1 + \ldots + x_7$.

For the codeword in FIG. 15, for example, the sequence of integer values from the scan line, representing the widths of the bars and spaces might be something like: 43, 19, 21, 19, 22, 18, 103, 96. The raw t-sequence $t_1, t_2, \ldots t_7$ would then be 62, 40, 40, 41, 40, 121, 199, and the width W would be 341.

In step 206 in FIG. 14, the raw t-sequence obtained in step 204 is normalized and rounded to integer values. Specifically, a value for the codeword's "module" or "unit" is first established by dividing the width W of the codeword by the total number of units for each codeword. In a PDF417 symbol, each codeword is seventeen units, so that the width W is divided by seventeen to obtain the unit of the codeword. Thus, for the example in FIG. 15, the unit would be (341/17)=20.0. Each value of the raw t-sequence is then divided by the unit and rounded to an integer to normalize the t-sequence. The normalized t-sequence for the codeword in FIG. 15 is 3, 2, 2, 2, 6, 10.

The normalized t-sequence is then compared to the t-sequences of the start and stop patterns of the code in step 208. If the scanner scans from both left to right and right to left, then the t-sequence must be compared to the start and stop patterns in both their normal and reverse orientations.

If there is a match in step 210, then the index is set in step 214 to a location in the scan line immediately following the pattern if it is a start pattern or immediately preceding it if it is a stop pattern. If the current t-sequence does not match either the start or the stop pattern, however, then in step 212, the index is incremented by one and steps 202 through 210 are repeated until either a match is found or the length of the scan line is exceeded.

Figure 16:
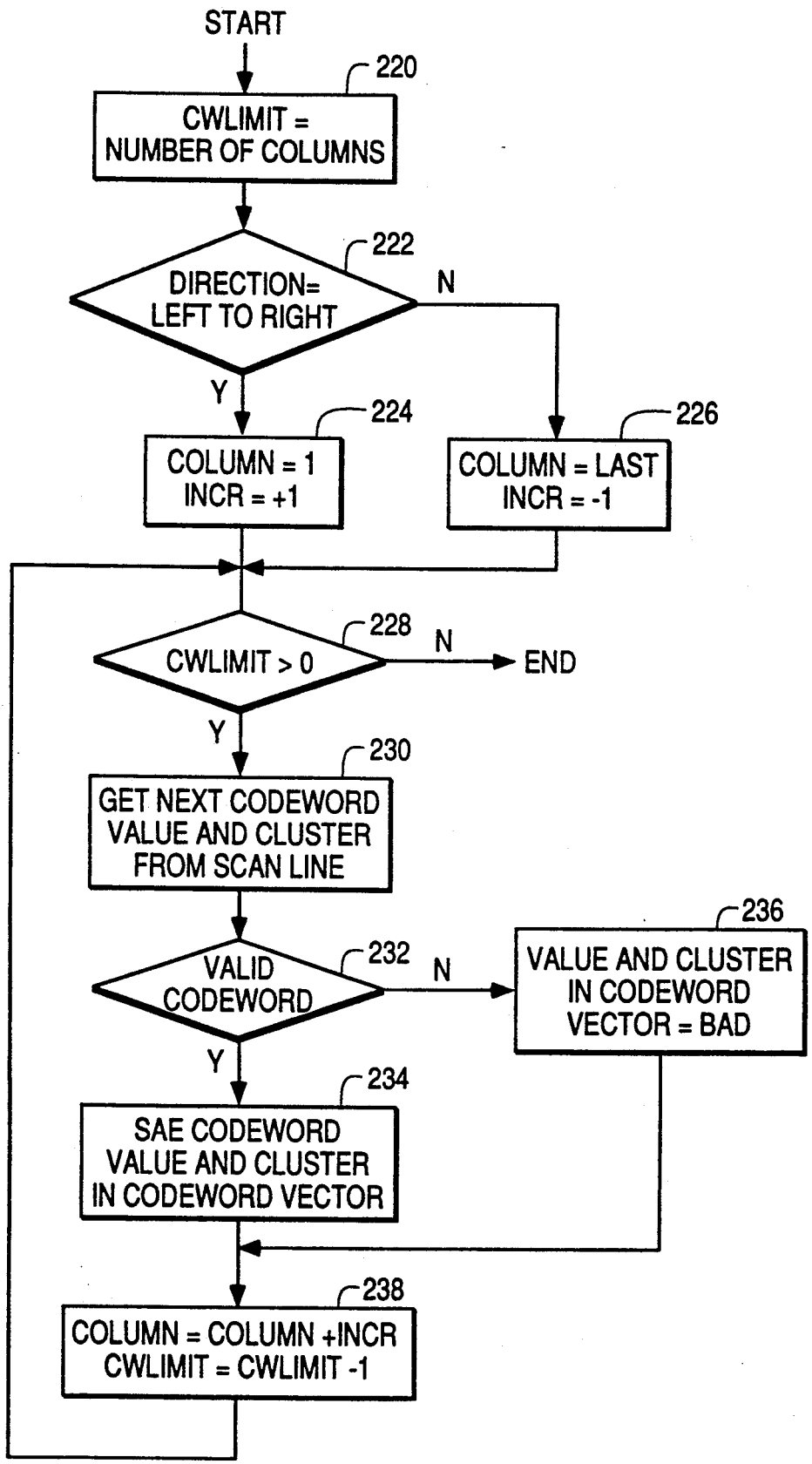
FIG. 16 is a flow diagram of the steps performed by the low-level decoder for decoding a scan line of data into a vector of codeword values and their cluster numbers.

FIG. 16 is a flow chart showing in greater detail the sequence of steps for decoding a scan line of data into a vector of codewords and their clusters as referred to in step 162 of FIG. 12 above. In decoding the individual codeword values and cluster numbers from the scan line, the low-level decoder begins decoding at the start or stop pattern and decodes as many codewords possible. For those codewords that are not successfully decoded, the codeword values in the codeword vector are set to "BAD".

At the completion of the sequence of steps shown in FIG. 16, the codeword vector will contain certain codeword values and cluster numbers in locations corresponding to the appropriate columns of the codewords that were successfully decoded. FIG. 17A shows an example of a codeword vector in which the codewords in eight of the ten columns were successfully decoded. The codeword values in columns 1 and 10 correspond to the left row indicator codeword in row 2 ($L_2$) and the right row indicator codeword in row 1 ($R_1$), respectively. The codewords in columns 5 and 7 were not successfully decoded as indicated by the notation "BAD" in those locations of the codeword vector.

Returning to the first step 220 of FIG. 16, an upper limit on the number of codewords that may be decoded ("cwlimit") is set equal to the number of columns in the codeword matrix. If this number of codewords is successfully decoded, then the decoding process for the current scan line is obviously complete.

Step 222 determines the direction of the scan if the scanner scans from both left to right and right to left. If the particular scan was from left to right as determined in step 222, then the column number of the first codeword is set to "1" in step 224 and the amount that it will incremented by ("incr") each time a subsequent codeword is decoded is set to "+1". If the scan was from right to left, however, then in step 226, the column number of the first codeword in the scan line will be the last column of the codeword matrix, and the incremental value is set to "−1".

Step 228 is the first step of a control loop in which individual codeword values and their cluster numbers are decoded from the scan line of data. In step 228, the codeword limit is tested to see if it is still greater than zero. If not, then all of the codewords in the scan line have been decoded and the loop is exited.

Otherwise, step 230 obtains the next codeword value and its cluster number from the scan line. This step will be discussed in further detail below in connection with FIG. 18.

If the codeword decoded in the previous step is a valid codeword as determined in step 232, then in step 234 the codeword value and its cluster number are saved in the codeword vector at a location corresponding to the column of the codeword. The codeword values thus placed in the codeword vector are ready for incorporation into the codeword matrix.

If the codeword decoded in step 230 is not a valid codeword, however, then the codeword value in the codeword vector corresponding to the current column is set to "BAD" in step 236 to indicate that this codeword was not successfully decoded. A "BAD" codeword is most likely to occur when the scan line crosses the boundary between two rows in the middle of the codeword.

Finally, in step 238, the current column number is either incremented or decremented depending on the direction of the scan, and the codeword limit is decremented by one. Steps 228–236 are then repeated until there has been an attempt to decode all of the codewords in the scan line.

Figure 18:
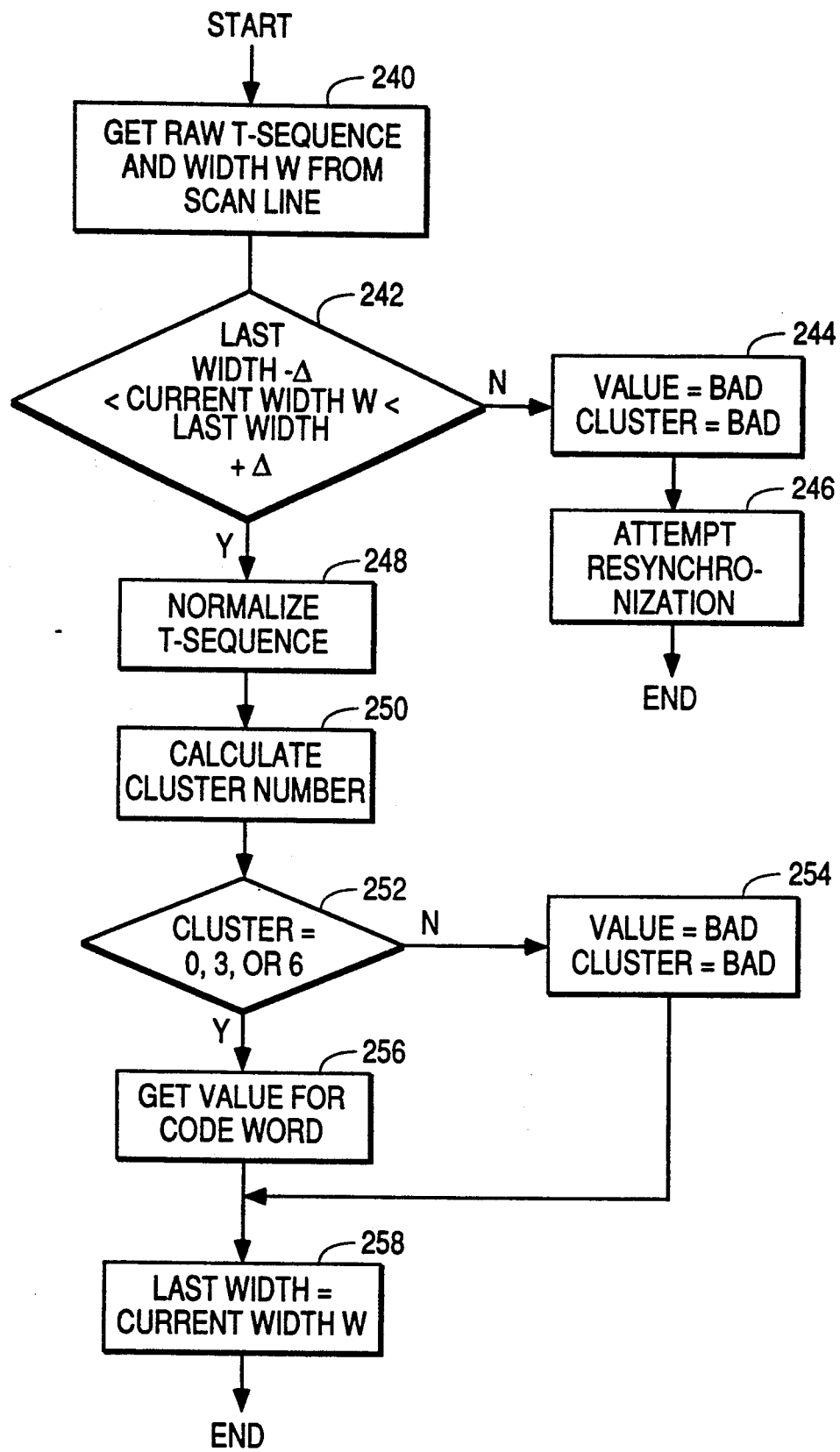
FIG. 18 is a flow diagram of the steps performed by the low-level decoder for decoding an individual codeword value and its cluster number from the scan line data.

FIG. 18 is a flow chart diagram showing the sequence of steps corresponding to step 230 in FIG. 16 and step 172 in FIG. 13 in which an attempt is made to decode an individual codeword value and cluster number from the scan line. In the first step 240, a raw t-sequence and the width W are obtained from the scan line. This same step was discussed previously in connection with step 204 in FIG. 14.

In step 242, the width W of the eight elements presumed to be the next codeword are compared to the width of the previously decoded codeword. If the current width W is not within a range of plus or minus a predetermined difference (delta), then there is probably a split (undercount by a multiple of two elements) or a merge (overcount by a multiple of two elements) error in the current codeword. This codeword is not decoded further, but rather in step 244 its value and cluster number are both set to BAD to indicate that it could not be decoded.

Then in step 246, an attempt is made to resynchronize to the boundary of the next codeword by finding a t-sequence with a corresponding width W that falls within a given tolerance of the expected width of a codeword, based on the width of the previous codeword. If the current width W is significantly greater than the expected width, indicating a possible merge error, then the last two integer values are dropped from the t-sequence until it falls within the proper limits. Likewise, if the current width W is significantly less than the expected width, indicating a possible split error, the next two integer values in the scan line are added to the t-sequence until it falls within the proper limits.

If the current width W is within a certain tolerance of the expected width, as determined in step 242, then an attempt is made to decode the codeword. In step 248, the raw t-sequence is normalized as described above in connection with step 206 in FIG. 14. Then in step 250, the cluster number is determined from the normalized t-sequence. The cluster number may be determined from the t-sequence (as opposed to the X-sequence described above) as follows:

$$\text{cluster number} = (T_1 - T_2 + T_5 - T_6) \bmod 9$$

For codewords in PDF417, valid cluster numbers are 0, 3, and 6. If in step 252 it is determined that the cluster number is not 0, 3, or 6, then the codeword is not valid. Accordingly, in step 254 the cluster number and value are set to "BAD" to indicate that the codeword was not successfully decoded.

Otherwise, in step 256, the normalized t-sequence and its cluster number are used to find the corresponding codeword value in a look-up table. If no corresponding codeword value is found for the t-sequence, then the codeword value is set to "BAD" to indicate that it was not successfully decoded.

Finally, in step 258 the "last width" value is updated to the current width W of the codeword for use in decoding the next codeword value from the scan line.

Figure 19A:
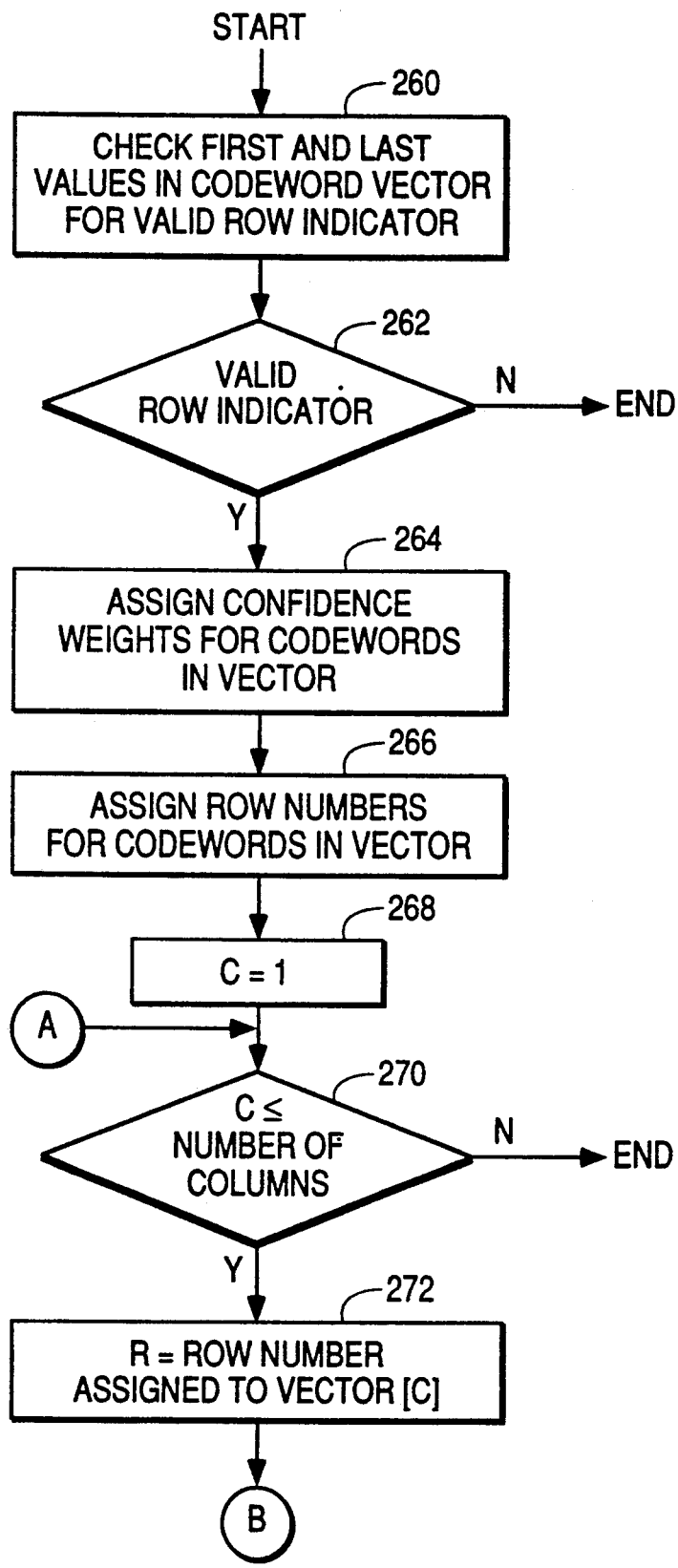
FIGS. 19A and 19B together are a flow diagram of the steps performed by the low-level decoder in order to update the codeword matrix using the codeword vector.
Figure 19B:
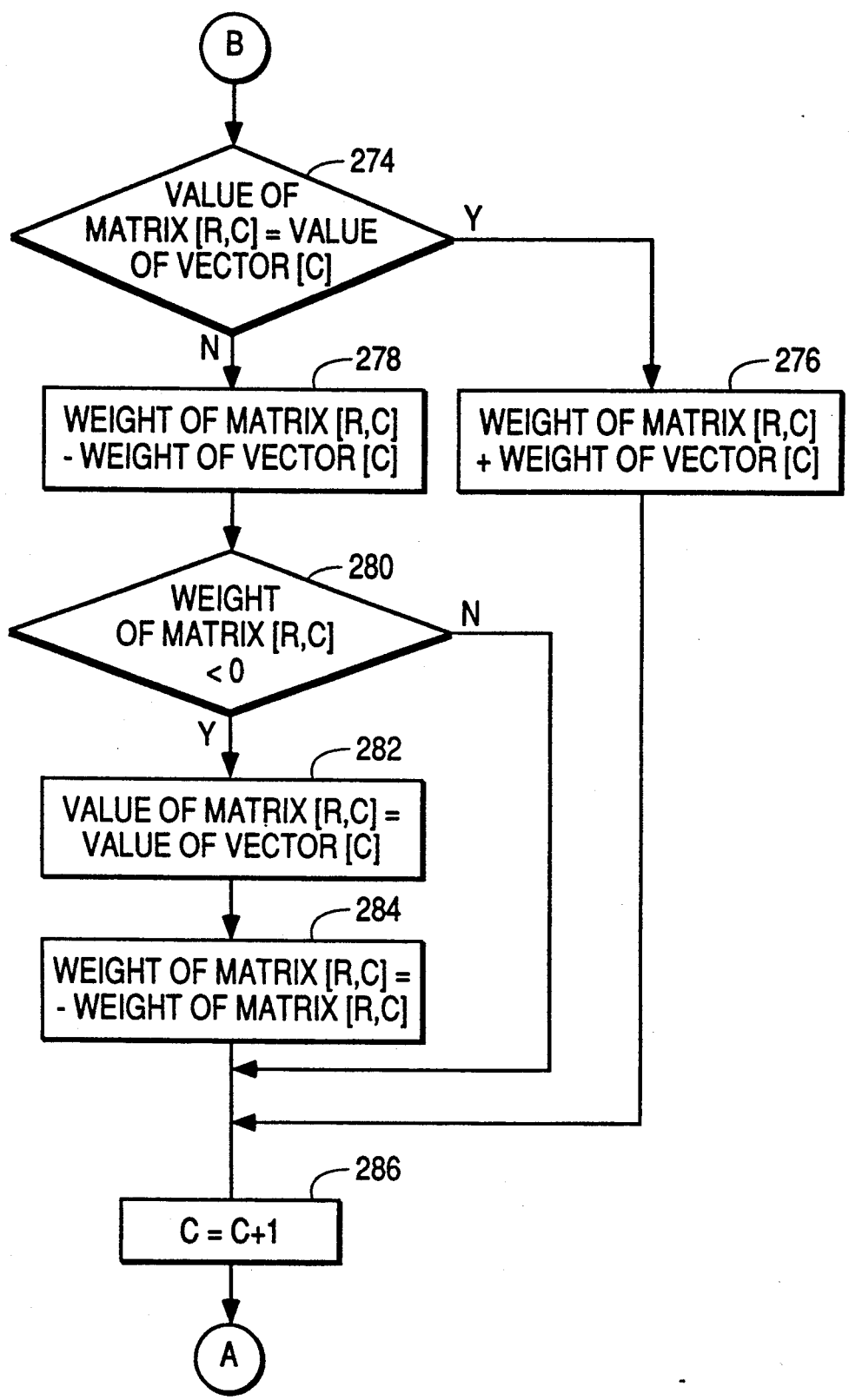

FIGS. 19A and 19B together comprise a flow chart of the sequence of steps executed by the low-level decoder in order to update the codeword matrix using the codeword vector. These figures explain in greater detail step 164 in FIG. 12 discussed previously.

The first step 260 of FIG. 19A checks the first and last values in the codeword vector to see if either is a valid row indicator. If neither the first nor the last values in the codeword vector are valid row indicators, then in step 262, the program exits the routine and no attempt is made to update the codeword matrix using the codeword vector.

If a valid row indicator is present, however, then in step 264 confidence weights are assigned to each codeword value in the codeword vector. Specifically, a confidence weight is assigned to each codeword depending on whether its nearest neighbors and their cluster were also decoded. For example, as shown in FIG. 17B, the codeword values in columns 1, 2, 3, 9, and 10 are assigned high confidence weights ("H") because their immediate neighbors were also successfully decoded and have the same cluster number. The codeword values for columns 4 and 8 are assigned medium confidence weights ("M") because one of their neighbors was successfully decoded and has the same cluster number but the other neighboring codeword value is "BAD". The codeword value in column 3 is assigned a very low confidence weight ("L") because neither of its neighbors was successfully decoded. Thus, the confidence weight for a codeword value at column i in the codeword vector is essentially a function of the cluster numbers of the codewords at columns $i-1$, i, and $i+1$. This function may be implemented by a look-up table whose index is calculated from the cluster numbers of the three codewords.

In step 266, a row number is assigned to each codeword value in the codeword vector based on the row indicator codewords and the cluster numbers. As shown in the example in FIG. 17C, the left row indicator codeword $L_2$ indicates that the row number is 2 and the cluster number is 6. The cluster numbers for the codeword values in columns 2-4 are also 6. Therefore, row number 2 is assigned to the codeword values in the first four columns of the codeword vector.

Also in the example in FIG. 17C, columns six and 8-10 all have a cluster number of 3 and the right row indicator codeword $R_1$ indicates that the row number is 1. Therefore, it can be assumed that the scan line crossed the row boundary between row 2 and row 1 and the codeword values in columns 6 and 8-10 should be assigned to row 1.

Once the confidence weights and row numbers have been assigned to each of the codeword values in the codeword vector, the codeword matrix is updated one codeword at a time. In step 268, the column number C of both the codeword vector and the codeword matrix is set is initially set to "1". Step 270 is the first step of an iterative loop which steps through the codewords in the codeword vector and uses them to update the corresponding codewords and their associated confidence weights in the codeword matrix. When the column number C exceeds the number of columns in step 270, then all of the codewords in the codeword vector have been processed and the routine ends.

For each codeword in the codeword vector, step 272 sets the row number R of the codeword matrix to the row number assigned in step 266 to the codeword in the codeword vector at the location C. Thus, for each codeword value in the codeword vector, there is a corresponding value in the codeword matrix at location [R,C].

Continuing in FIG. 19B, step 274 determines whether the current codeword value in location [R,C] in the codeword matrix is the same as the corresponding codeword value in the codeword vector at column C. If the values are the same, then in step 276, the confidence weight assigned to the codeword value in matrix location [R,C] is increased by the confidence weight of the corresponding codeword value in the codeword vector. If not, the confidence weight of the codeword value in the matrix is decreased by the confidence weight of the codeword value in the vector in step 278.

If the confidence weight was decreased in step 278, then in step 280 that confidence weight is tested to see if it was decreased below zero. If the confidence weight is less than zero, then in step 282 the new codeword value in the codeword vector is substituted for the current codeword value in the corresponding location in the codeword matrix. The confidence weight assigned to the codeword value in the matrix is also changed to a positive value in step 284.

Finally, in step 286 the column number C is incremented by 1 for processing the next codeword value in the codeword vector and program control is returned to step 270 for repeating steps 272 through 286 for all of the columns in the vector.

Returning briefly to step 154 in FIG. 12, each time after the codeword matrix has been filled in with the new vector of codeword values and the confidence weights have been updated, an attempt is made to fill in the rest of the matrix using the built-in error correction capability of the symbol. The number and location of codewords which have not yet been successfully decoded may be determined by comparing the confidence weights assigned to each of the codeword values in the matrix with a predetermined threshold. Those values having confidence weights below the threshold are considered to not yet be decoded. If the number of codewords not yet decoded is less than the error correction capability of the symbol as determined by the security level, then an attempt is made to correct the matrix.

It will be apparent to those skilled in the art that various modifications and variations can be made in the decoding method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for decoding a two-dimensional bar code symbol, the bar code symbol including a plurality of ordered, adjacent rows of codewords of bar-coded information from a set of codewords, the set of codewords being partitioned into at least three mutually exclusive clusters, each row in the symbol having at least one row indicator codeword and containing only codewords from a cluster different from the codewords in an adjacent row, comprising:

means for scanning the two-dimensional bar code symbol to produce scan lines of data representing the bar-coded information in the codewords of the symbol;

means for decoding a scan line of data into a vector of codeword values corresponding to the codewords that were scanned, at least one of the codeword values being for a row indicator codeword;

means for assigning a row number to each of the codeword values in the vector based on the value of the row indicator codeword and the cluster of the codeword; and means for filling in a codeword matrix with the codeword values in the vector according to their assigned row numbers.

2. The apparatus of claim 1, wherein the row indicator codewords contain information regarding the number of rows in the symbol and the number of codewords in each row, and wherein the apparatus further comprises means for decoding a scan line of data to obtain a codeword value for a row indicator codeword, and means for determining one of the number of rows and the number of codewords in each row from the codeword value for the row indicator codeword.

3. The apparatus of claim 2, wherein each row of the symbol contains at least one of a start pattern and a stop pattern of bar-coded information, wherein the means for decoding a scan line of data to obtain a codeword value for a row indicator codeword includes means for locating a sequence of data in the scan line corresponding to one of the start pattern and the stop pattern.

4. The apparatus of claim 1, wherein the symbol contains at least one error correction codeword and the row indicator codewords contain information regarding the number of rows in the symbol, the number of codewords in each row, and the number of error correction codewords, and wherein the apparatus further comprises means for decoding a scan line of data to obtain a codeword value for a row indicator codeword, means for determining a value for one of the number of rows, the number of codewords in each row, and the number of error correction codewords from the codeword value for the row indicator codeword, means for adjusting a confidence weight for a corresponding one of the number of rows, the number of codewords in each row, and the number of error correction codewords based on the value determined in the preceding step and a previous value obtained by decoding a row indicator codeword, and means for initializing the codeword matrix when the confidence weights for the number of rows, the number of codewords in each row, and the number of error correction codewords all exceed a predetermined threshold.

5. The apparatus of claim 4, wherein each row of the symbol contains at least one of a start pattern and a stop pattern of bar-coded information, and wherein the means for decoding a scan line of data to obtain a codeword value for row indicator codeword includes means for locating a sequence of data in the scan line corresponding to one of the start pattern and the stop pattern.

6. The apparatus of claim 1, wherein each row of the symbol contains at least one of a start pattern and a stop pattern of bar-coded information, and wherein the means for decoding a scan line of data into a vector of codeword values includes means for locating a sequence of data in the scan line corresponding to one of the start pattern and the stop pattern.

7. The apparatus of claim 1, further comprising means for assigning a confidence weight to each of the codeword values in the vector, and means for adjusting a confidence weight of each of the corresponding codeword values in the matrix based on the codeword value in the vector and a current value of each of the corresponding codeword values in the matrix.

8. The apparatus of claim 1, wherein the symbol contains at least one error correction codeword, and wherein the apparatus further comprises means for locating in the matrix the codeword values for any codewords that have not been successfully decoded, and means for correcting any erroneous codeword values in the codeword matrix using the error correction codeword.

9. A method for decoding a two-dimensional bar code symbol, the bar code symbol including a plurality of ordered, adjacent rows of codewords of bar-coded information from a set of codewords, the set of codewords being partitioned into at least three mutually exclusive clusters, each row in the symbol having at least one row indicator codeword and containing only codewords from a cluster different from the codewords in an adjacent row, comprising the steps of:

scanning the two-dimensional bar code symbol to produce scan lines of data representing the bar-coded information in the codewords of the symbol;

decoding a scan line of data into a vector of codeword values corresponding to the codewords that were scanned, at least one of the codeword values being for a row indicator codeword;

assigning a row number to each of the codeword values in the vector based on the value of the row indicator codeword and the cluster of the codeword; and filling in a codeword matrix with the codeword values in the vector according to their assigned row numbers.

10. The method of claim 9, wherein the row indicator codewords contain information regarding the number of rows in the symbol and the number of codewords in each row, and wherein the method further comprises the steps of decoding a scan line of data to obtain a codeword value for a row indicator codeword, and determining one of the number of rows and the number of codewords in each row from the codeword value for the row indicator codeword.

11. The method of claim 10, wherein each row of the symbol contains at least one of a start pattern and a stop pattern of bar-coded information, and wherein the step of decoding a scan line of data to obtain a codeword value for a row indicator codeword includes the substep of locating a sequence of data in the scan line corresponding to one of the start pattern and the stop pattern.

12. The method of claim 9, wherein the symbol contains at least one error correction codeword and the row indicator codewords contain information regarding the number of rows in the symbol, the number of codewords in each row, and the number of error correction codewords, and wherein the method further comprises the steps of decoding a scan line of data to obtain a codeword value for a row indicator codeword, determining a value for one of the number of rows, the number of codewords in each row, and the number of error correction codewords from the codeword value for the row indicator codeword, adjusting a confidence weight for a corresponding one of the number of rows, the number of codewords in each row, and the number of error correction codewords based on the value determined in the preceding step and a previous value obtained by decoding a row indicator codeword, and initializing the codeword matrix when the confidence weights for the number of rows, the number of codewords in each row, and the number of error correction codewords all exceed a predetermined threshold.

13. The method of claim 12, wherein each row of the symbol contains at least one of a start pattern and a stop pattern of bar-coded information, and wherein the step of decoding a scan line of data to obtain a codeword value for a row indicator codeword includes the substep of locating a sequence of data in the scan line corresponding to one of the start pattern and the stop pattern.

14. The method of claim 9, wherein each row of the symbol contains at least one of a start pattern and a stop pattern of bar-coded information, and wherein the step of decoding a scan line of data into a vector of codeword values includes the substep of locating a sequence of data in the scan line corresponding to one of the start pattern and the stop pattern.

15. The method of claim 9, further comprising the steps of assigning a confidence weight to each of the codeword values in the vector, adjusting a confidence weight of each of the corresponding codeword values in the matrix based on the codeword value in the vector and a current value of each of the corresponding codeword values in the matrix.

16. The method of claim 9, wherein the symbol contains at least one error correction codeword, and wherein the method further comprises the steps of locating in the matrix the codeword values for any codewords that have not been successfully decoded, and correcting any erroneous codeword values in the codeword matrix using the error correction codeword.

17. A system for representing and recognizing data on a record carrier in the form of a machine readable two-dimensional bar code structure comprising:

encoding means including:

means for entering data in said encoding means, processing means for encoding said data into a two-dimensional bar code structure and for generating transfer drive signals, the bar code structure including a plurality of ordered, adjacent rows of codewords of bar-coded information from a set of codewords, the set of codewords being partitioned into at least three mutually exclusive clusters, each row in the two-dimensional bar code structure having at least one row indicator codeword and containing only codewords from a cluster different from the codewords in an adjacent row, means for transferring an image of the two-dimensional bar code structure onto a portable record carrier in response to said transfer drive signals; and recognition means including:

means for scanning the image of the two-dimensional bar code structure to produce scan lines of data representing the bar-coded information in the codewords of the two-dimensional bar code structure, means for decoding a scan line of data into a vector of codeword values corresponding to the codewords that were scanned, at least one of the codeword values being for a row indicator codeword, means for assigning a row number to each of the codeword values in the vector based on the values of the row indicator codeword and the cluster of the codeword, and means for filling in a codeword matrix with the codeword values in the vector according to their assigned row numbers.

18. The system of claim 17, wherein the row indicator codewords contain information regarding the number of rows in the two-dimensional bar code structure and the number of codewords in each row, and wherein the recognition means further includes means for decoding a scan line of data to obtain a codeword value for a row indicator codeword, and means for determining one of the number of rows and the number of codewords in each row from the codeword value for the row indicator codeword.

19. The system of claim 18, wherein each row of the two-dimensional bar code structure contains a start and a stop pattern of bar-coded information, and wherein the means for decoding a scan line of data to obtain a codeword value for a row indicator codeword includes means for locating a sequence of data in the scan line corresponding to one of the start and the stop pattern.

20. The system of claim 17, wherein the two-dimensional bar code structure contains at least one error correction codeword and the row indicator codewords contain information regarding the number of rows in the two-dimensional bar code structure, the number of codewords in each row, and the number of error correction codewords, and wherein the recognition means further includes means for decoding a scan line of data to obtain a codeword value for a row indicator codeword, means for determining a value for one of the number of rows, the number of codewords in each row, and the number of error correction codewords from the codeword value for the row indicator codeword, means for adjusting a confidence weight for a corresponding one of the number of rows, the number of codewords in each row, and the number of error correction codewords based on the value determined in the preceding step and a previous value obtained by decoding a row indicator codeword, and means for initializing the codeword matrix when the confidence weights for the number of rows, the number of codewords in each row, and the number of error correction codewords all exceed a predetermined threshold.

21. The system of claim 20, wherein each row of the two-dimensional bar code structure contains a start and a stop pattern of bar-coded information, and wherein the means for decoding a scan line of data to obtain a codeword value for a row indicator codeword includes means for locating a sequence of data in the scan line corresponding to one of the start and the stop pattern.

22. The system of claim 17, wherein each row of the two-dimensional bar code structure contains a start and a stop pattern of bar-coded information, and wherein the means for decoding a scan line of data to obtain a codeword value for a row indicator codeword includes means for locating a sequence of data in the scan line corresponding to one of the start and the stop pattern.

23. The system of claim 17, wherein the recognition means further includes means for assigning a confidence weight to each of the codeword values in the vector, and for adjusting a confidence weight of each of the corresponding codeword values in the matrix based on the codeword value in the vector and a current value of each of the corresponding codeword values in the matrix.

24. The system of claim 17, wherein the two-dimensional bar code structure contains at least one error correction codeword, and wherein the recognition means further includes means for locating in the matrix the codeword values for any codewords that have not been successfully decoded, and means for correcting any erroneous codeword values in the codeword matrix using the error correction codeword.

25. A method for representing and recognizing data on a record carrier in the form of a machine readable two-dimensional bar code structure comprising the steps of:

entering said data into an encoding station;

encoding said data into a two-dimensional bar code structure, the two-dimensional bar code structure including a plurality of ordered, adjacent rows of codewords of bar-coded information from a set of codewords, the set of codewords being partitioned into at least three mutually exclusive clusters, each row in the two-dimensional bar code structure having at least one row indicator codeword and containing only codewords from a cluster different from the codewords in an adjacent row, transferring an image of the two-dimensional bar code structure onto a portable record carrier;

scanning the image of the two-dimensional bar code structure to produce scan lines of data representing the bar-coded information in the codewords;

decoding a scan line of data into a vector of codeword values corresponding to the codewords that were scanned, at least one of the codeword values being for a row indicator codeword;

assigning a row number to each of the codeword values in the vector based on the value of the row indicator codeword and the cluster of the codeword; and filling in a codeword matrix with the codeword values in the vector according to their assigned row numbers.

26. The method of claim 25, wherein the row indicator codewords contain information regarding the number of rows in the two-dimensional bar code structure and the number of codewords in each row, and wherein the method further comprises the steps of decoding a scan line of data to obtain a codeword value for a row indicator codeword, and determining one of the number of rows and the number of codewords in each row from the codeword value for the row indicator codeword.

27. The method of claim 26, wherein each row of the two-dimensional bar code structure contains a start and a stop pattern of bar-coded information, and wherein the step of decoding a scan line of data to obtain a codeword value for a row indicator codeword includes the substep of locating a sequence of data in the scan line corresponding to one of the start and the stop pattern.

28. The method of claim 25, wherein the two-dimensional bar code structure contains at least one error correction codeword and the row indicator codewords contain information regarding the number of rows in the two-dimensional bar code structure, the number of codewords in each row, and the number of error correction codewords, and wherein the method further comprises the steps of decoding a scan line of data to obtain a codeword value for a row indicator codeword, determining a value for one of the number of rows, the number of codewords in each row, and the number of error correction codewords from the codeword value for the row indicator codeword, adjusting a confidence weight for a corresponding one of the number of rows, the number of codewords in each row, and the number of error correction codewords based on the value determined in the preceding step and a previous value obtained by decoding a row indicator codeword, and initializing the codeword matrix when the confidence weights for the number of rows, the number of codewords in each row, and the number of error correction codewords all exceed a predetermined threshold.

29. The method of claim 25, wherein each row of the two-dimensional bar code structure contains a start and a stop pattern of bar-coded information, and wherein the step of decoding a scan line of data to obtain a codeword value for a row indicator codeword includes the substep of locating a sequence of data in the scan line corresponding to one of the start and the stop pattern.

30. The method of claim 25, wherein each row of the two-dimensional bar code structure contains a start and a stop pattern of bar-coded information, and wherein the step of decoding a scan line of data into a vector of codeword values includes the substep of locating a sequence of data in the scan line corresponding to one of the start and the stop pattern.

31. The method of claim 25, further comprising the steps of assigning a confidence weight to each of the codeword values in the vector, adjusting a confidence weight of each of the corresponding codeword values in the matrix based on the codeword value in the vector and a current value of each of the corresponding codeword values in the matrix.

32. The method of claim 25, wherein the two-dimensional bar code structure contains at least one error correction codeword, and wherein the method further comprises the steps of locating in the matrix the codeword values for any codewords that have not been successfully decoded, and correcting any erroneous codeword values in the codeword matrix using the error correction codeword.

* * * * *